(12) United States Patent
Itogawa et al.

(10) Patent No.: US 12,212,141 B2
(45) Date of Patent: Jan. 28, 2025

(54) GRID SYSTEM AND CONTROL DEVICE OF GRID SYSTEM

(71) Applicant: Mitsubishi Electric Corporation, Tokyo (JP)

(72) Inventors: Yuki Itogawa, Tokyo (JP); Sadayuki Inoue, Tokyo (JP); Tomihiro Takano, Tokyo (JP); Keishi Matsuda, Tokyo (JP); Xiaowei Dui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/272,351

(22) PCT Filed: Jan. 29, 2021

(86) PCT No.: PCT/JP2021/003262
§ 371 (c)(1),
(2) Date: Jul. 14, 2023

(87) PCT Pub. No.: WO2022/162873
PCT Pub. Date: Aug. 4, 2022

(65) Prior Publication Data
US 2024/0079877 A1    Mar. 7, 2024

(51) Int. Cl.
*H02J 3/16* (2006.01)
*G05F 1/66* (2006.01)
(Continued)

(52) U.S. Cl.
CPC .................. *H02J 3/16* (2013.01); *G05F 1/66* (2013.01); *H02J 3/18* (2013.01); *H02J 3/32* (2013.01); *H02J 3/381* (2013.01); *H02M 7/48* (2013.01)

(58) Field of Classification Search
CPC .......... H02J 3/381; H02J 2300/20; H02J 3/16; H02J 3/32; H02J 3/241; H02J 2203/10;
(Continued)

(56) References Cited

U.S. PATENT DOCUMENTS

2021/0257839 A1* 8/2021 Kato ..................... G05F 1/67

FOREIGN PATENT DOCUMENTS

| JP | H06-303780 A | 10/1994 |
|---|---|---|
| JP | 2012-143018 A | 7/2012 |

(Continued)

OTHER PUBLICATIONS

Deng, Yan, et al. "Enhanced power flow control for grid-connected droop-controlled inverters with improved stability." IEEE Transactions on Industrial Electronics 64.7 (2016): 5919-5929. (Year: 2016).*

(Continued)

*Primary Examiner* — Ryan Johnson
(74) *Attorney, Agent, or Firm* — XSENSUS LLP

(57) ABSTRACT

A power conversion device inputs or outputs a power for changing a state quantity of a distribution grid to which a voltage source device is connected, to or from the distribution grid. A grid control unit calculates a power command value of the power conversion device such that a drooping characteristic is provided for compensating for a deviation from a control target of the state quantity obtained from an output of a detector. A frequency characteristic of control computation for calculating a power command value from the deviation in the system control unit is defined such that a first control gain value in a first frequency range including direct current is set corresponding to a slope of the drooping characteristic, and a second control gain value in a second (Continued)

frequency range including higher frequencies than the first frequency range is set to be lower than the first control gain value.

17 Claims, 19 Drawing Sheets

(51) Int. Cl.
*H02J 3/18* (2006.01)
*H02J 3/32* (2006.01)
*H02J 3/38* (2006.01)
*H02M 7/48* (2007.01)

(58) Field of Classification Search
CPC .......... H02J 3/18; H02M 1/0025; H02M 7/48; Y02E 40/30; Y02E 10/56; G05F 1/66; Y04S 10/22
See application file for complete search history.

(56) References Cited

FOREIGN PATENT DOCUMENTS

| | | |
|---|---|---|
| JP | 2017-147875 A | 8/2017 |
| JP | 6510741 B1 | 5/2019 |
| WO | WO-2020070814 A1 * | 4/2020 .......... H02M 1/0025 |

OTHER PUBLICATIONS

International Search Report and Written Opinion mailed on Mar. 9, 2021, received for PCT Application PCT/JP2021/003262, filed on Jan. 29, 2021, 9 pages including English Translation.
B. Seal, "Common Functions for Smart Inverters 4th Edition", 4th Edition, Electric Power Research Institute, Inc., Dec. 2016, 170 pages. on Aug. 31, 2021, received for JP Application 2021-532323, 12 pages.
Notice of Reasons for Refusal mailed on Aug. 31, 2021, received for JP Application 2021-532323, 12 pages including English Translation.

* cited by examiner (a)

(b)

(a)

(b)

$$\frac{Qref}{\Delta Vrms} = Kp \cdot \left(1 + \frac{1}{\frac{Kp}{Kvq0} + sT}\right) \quad \cdots (3)$$

FIG.19
(a) 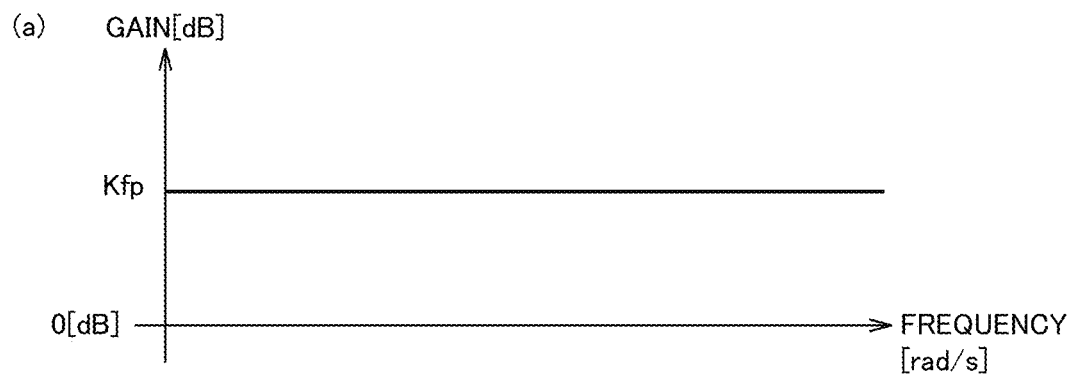
(b)
FIG.20
(a) 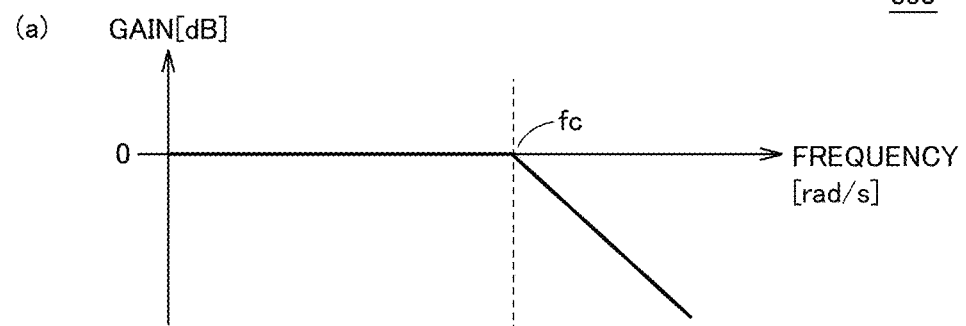
(b) 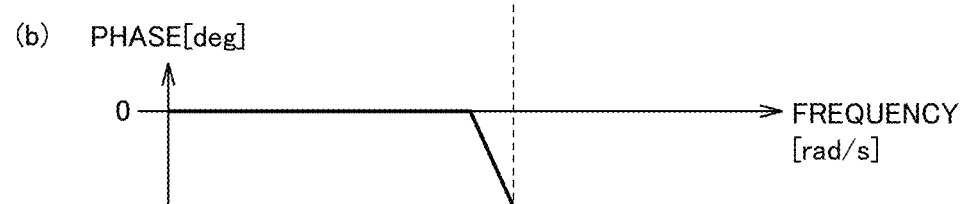

GRID SYSTEM AND CONTROL DEVICE OF GRID SYSTEM

CROSS-REFERENCE TO RELATED APPLICATION

The present application is based on PCT filing PCT/JP2021/003262, filed Jan. 29, 2021, the entire contents of which are incorporated herein by reference.

TECHNICAL FIELD

The present disclosure relates to a grid system and a control device of a grid system.

BACKGROUND ART

A grid system for stably controlling variations in grid frequency and variations in grid voltage caused by power variations in a power grid is described in Japanese Patent No. 6510741 (PTL 1).

PTL 1 describes stabilization of a grid system by inputting or outputting an active power and a reactive power from a power converter to a distribution grid. Specifically, control of an active power for change in grid frequency (hereinafter also referred to as "f-P control") and control of a reactive power for change in grid voltage (hereinafter also referred to as "V-Q control") are performed.

According to PTL 1, in these f-P control and V-Q control, a power command value is corrected in accordance with proportional (P) control that multiplies a frequency change amount and a voltage change amount by a proportional gain, thereby imparting a drooping characteristic. Further, a dead band in which the power command value is not corrected is provided for a small change of grid frequency and grid voltage.

CITATION LIST

Patent Literature

PTL 1: Japanese Patent No. 6510741

SUMMARY OF INVENTION

Technical Problem

However, in PTL 1, since the f-P control and the V-Q control are performed by proportional control using a single gain, the proportional control gain is defined by the slope of the drooping characteristic. As a result, control stability may be deteriorated in some cases due to influences of a time lag element and the like.

The present disclosure is made to solve such a problem and an object of the present disclosure is to provide control for a grid system capable of grid stabilizing control having a predetermined drooping characteristic, without deteriorating control stability.

Solution to Problem

According to an aspect of the present disclosure, a grid system includes a distribution grid to which a voltage source device is connected, a detector to detect a state quantity of the distribution grid, a power conversion device, and a grid control unit. The power conversion device inputs or outputs a power for changing the state quantity to the distribution grid. The grid control unit calculates a power command value for the power conversion device from a deviation between the state quantity obtained from an output of the detector and a control target of the state quantity such that a drooping characteristic for compensating for the deviation is provided. The grid control unit performs control computation having a predetermined frequency characteristic, with the deviation as an input and the power command value as an output. The frequency characteristic is defined such that a first control gain value in a first frequency range including direct current is set corresponding to a slope of the drooping characteristic and a second control gain value in a second frequency range including higher frequencies than the first frequency range is set to be lower than the first control gain value.

According to another aspect of the present disclosure, a control device of a grid system including a distribution grid to which a voltage source device is connected includes a deviation computation unit and a control computation unit. The deviation computation unit calculates a deviation between a state quantity of the distribution grid and a control target of the state quantity, based on an output of a detector provided in the distribution grid. The control computation unit generates a power command value for a power conversion device for inputting or outputting a power for changing the state quantity to or from the distribution grid. The control computation unit performs control computation having a predetermined frequency characteristic, with the deviation as an input and the power command value as an output, such that a drooping characteristic for compensating for the deviation calculated by the deviation computation unit is provided. The frequency characteristic is defined such that a first control gain value in a first frequency range including direct current and a target value of a grid frequency of the distribution grid is set corresponding to a slope of the drooping characteristic and a second control gain value in a second frequency range including higher frequencies than the first frequency range is set to be lower than the first control gain value.

Advantageous Effects of Invention

According to the present disclosure, even when the control gain value in the first frequency range including direct current is set to be high in order to ensure the slope of the drooping characteristic, the control gain in the second frequency range with higher frequencies can be reduced, so that grid stabilization control having a predetermined drooping characteristic can be implemented without impairing the control stability.

BRIEF DESCRIPTION OF DRAWINGS

FIG. 19 is a Bode plot showing a frequency characteristic of f-P control according to the comparative example.

FIG. 20 is a Bode plot showing an example of a frequency characteristic of input/output response of f-P control in a power conversion device alone.

DESCRIPTION OF EMBODIMENTS

Figure 1:
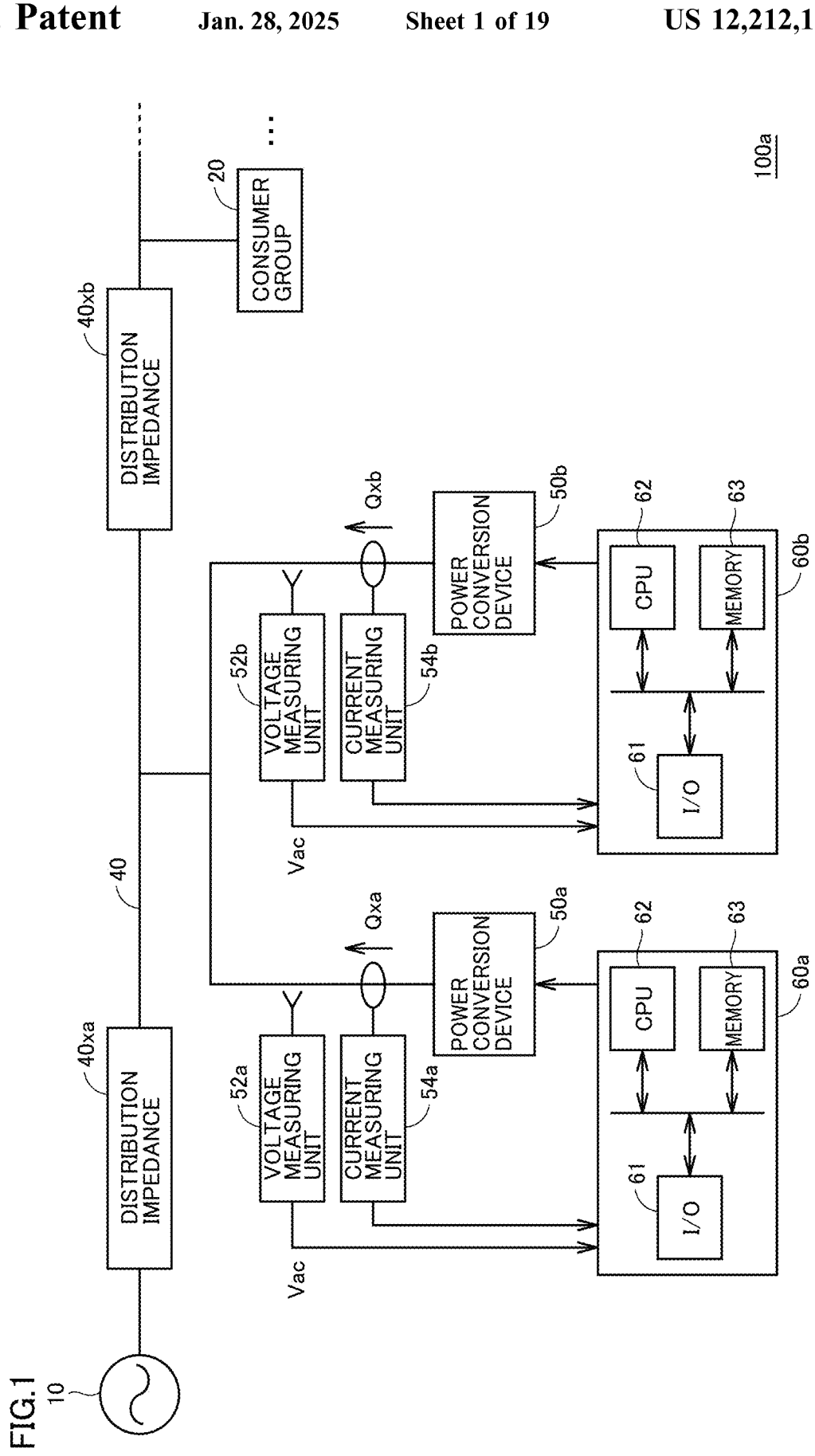
FIG. 1 is a block diagram illustrating a schematic configuration of a grid system according to a first embodiment.

Embodiments of the present disclosure will be described in detail below with reference to the drawings. In the following, like or corresponding parts in the drawings are denoted by like reference signs and a description thereof will basically not be repeated.

First Embodiment

In a first embodiment, reactive power control (V-Q control) for change of grid voltage will be described as grid stabilizing control.

As shown in FIG. 1, a grid system 100a according to the first embodiment includes a voltage source device 10, a distribution grid 40 including a transmission line, power conversion devices 50a, 50b, voltage measuring units 52a, 52b, current measuring units 54a, 54b, and grid control units 60a, 60b.

Voltage source device 10 is connected to distribution grid 40 to output an AC voltage to distribution grid 40. It is conceivable that voltage source device 10 corresponds to a power grid or is a voltage source isolated from and independent of a power grid. Voltage source device 10 can include, for example, a power generation device such as a power generator, a combination of a power generation device and a load, or a large-capacity power storage device.

A consumer group 20 is connected to distribution grid 40. Consumer group 20 consumes power supplied from the distribution grid. Alternatively, in consumer group 20, the generated power by a photovoltaic generation device (not shown) or the like may reversely flow to distribution grid 40.

Distribution grid 40 has a distribution impedance corresponding to the length of the transmission line. In the example in FIG. 1, a distribution impedance 40xa exists between voltage source device 10 and a connection point to power conversion devices 50a, 50b on distribution grid 40, and a distribution impedance 40xb exists between the connection point and consumer group 20.

The distribution line impedance is characterized in that, in a power transmission line of the same kind, the distribution impedance increases as the wiring length increases. When a reactive power (current) flows through distribution grid 40, the grid voltage rises or lowers depending on the polarity (phase) of the reactive power. The amount of change of the grid voltage in this case is determined in accordance with the magnitude of inductance (wiring inductance) that is produced on the distribution line in the distribution impedance. In the following, for simplification of explanation, it is assumed that the influence of the interaction between active power and wiring inductance and between reactive power and wiring resistance on the grid voltage is small enough to be ignored.

Voltage measuring units 52a, 52b and current measuring units 54a, 54b are disposed for detecting a state of distribution grid 40. Voltage measuring units 52a, 52b measure an AC voltage (grid voltage) at a connection point to distribution grid 40. Similarly, current measuring units 54a, 54b measure an AC current (grid current) at a connection point to distribution grid 40. The measured grid voltage and grid current are input to grid control units 60a, 60b.

In the example in FIG. 1, voltage measuring units 52a, 52b and current measuring units 54a, 54b are installed in proximity to power conversion devices 50a, 50b, but they may be disposed at locations away from power conversion devices 50a, 50b. Alternatively, voltage measuring units 52a, 52b and current measuring units 54a, 54b may be disposed at a plurality of locations on distribution grid 40, and the grid voltages and grid currents measured at a plurality of locations may be selectively input to grid control units 60a, 60b.

Power conversion devices 50a, 50b are configured to output a reactive power to distribution grid 40 in accordance with a power command value from grid control units 60a, 60b. As described above, in the first embodiment, V-Q control is described, and power conversion devices 50a, 50b can be configured using self-commutated or line-commutated reactive power compensating devices such as static synchronous compensators (STATCOMs) for injecting reactive powers Qxa, Qxb into distribution grid 40.

In the following, a reactive power in a current phase advance direction (that is, grid voltage rising direction) with respect to the phase of the grid voltage is represented by a positive value (Q>0), while a reactive power in a current phase delay direction (that is, grid voltage lowering direction) is represented by a negative value (Q<0). Power conversion devices 50a, 50b may be connected to a power storage device and/or a distributed power source (solar cell panel, etc.) for demand and supply adjusting means.

Grid control units 60a, 60b generate a power command value of power conversion devices 50a, 50b, based on a state of distribution grid 40 measured by voltage measuring units 52a, 52b and current measuring units 54a, 54b (specifically, grid voltage and/or grid current). In the first embodiment in which V-Q control is described, grid control units 60a, 60b generate a power command value Qref. According to the definition above, Qref>0 is to specify output of a reactive power (Qxa, Qxb>0) in the current phase advance direction (voltage rising direction), and Qref<0 is to specify output of a reactive power (Qxa, Qxb<0) in the current phase delay direction (voltage lowering direction).

For example, as illustrated in FIG. 1, grid control units 60a, 60b can be configured based on a computer including a central processing unit (CPU) 151, a memory 152, and an input/output (I/O) circuit 153. CPU 51, memory 152, and I/O circuit 153 can exchange data with each other via a bus 155. A program is stored in advance in a partial area of memory 152, and CPU 151 executes the program to implement the functions of V-Q control described later and f-P control described in the second embodiment. I/O circuit 153 receives/outputs signals and data from/to the outside of grid control units 60a, 60b.

Alternatively, unlike the example in FIG. 1, at least a part of grid control units 60a, 60b may be configured using circuitry such as a field programmable gate array (FPGA) or an application specific integrated circuit (ASIC). At least a part of grid control units 60a, 60b may be configured with an analog circuit. In this way, the functions of V-Q control and f-P control described later can be implemented by at least one of software processing and hardware processing.

In the example in FIG. 1, power conversion device 50a and grid control unit 60a as well as power conversion device 50b and grid control unit 60b are configured with separate devices and connected through wired or wireless communication. However, grid control units 60a, 60b may be internal functions of power conversion devices 50a, 50b, and power conversion device 50a and grid control unit 60a as well as power conversion device 50b and grid control unit 60b may be configured as a single device.

The control of power conversion device 50a by grid control unit 60a and the control of power conversion device 50b by grid control unit 60b are common. In the following, therefore, grid stabilizing control using each of power conversion devices 50a, 50b by the corresponding one of grid control units 60a, 60b will be collectively described without the index a, b of each element.

First of all, the conventional V-Q control described in PTL 1 and the like will be described as a comparative example with reference to FIG. 2 to FIG. 7.

Figure 2:
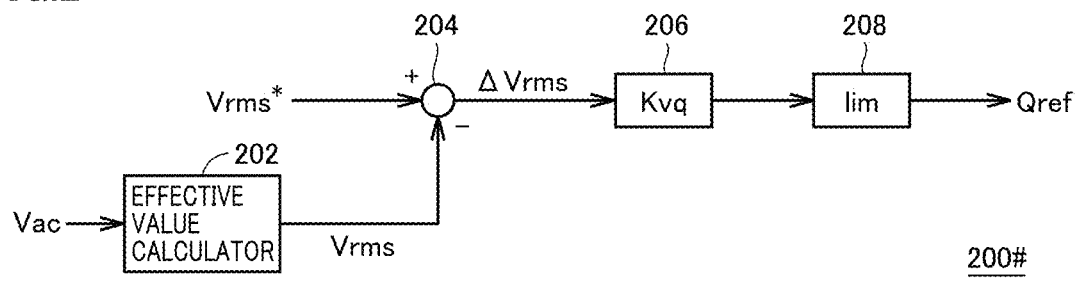
FIG. 2 is a control block diagram of a V-Q control unit according to a comparative example.

As shown in FIG. 2, a V-Q control unit 200 # according to the comparative example is executed by an effective value calculator 202, a subtractor 204, a proportional control element 206, and a limiter 208. Effective value calculator 202 calculates a grid voltage effective value Vrms from a grid voltage Vac measured by voltage measuring unit 52.

Subtractor 204 calculates a voltage deviation ΔVrms by subtracting grid voltage Vac calculated by effective value calculator 202 from grid voltage command value Vrms*. Proportional control element 206 outputs a multiplication value of voltage deviation ΔVrms and a proportional gain Kvq. An output value of proportional control element 206 passes through limiter 208 whereby power command value Qref is generated.

Limiter 208 fixes Qref=Qrefup when Kvq·ΔVrms>Qrefup and fixes Qref=Qrefdwn when Kvq·ΔVrms<Qrefdwn (Qrefdwn<0, Qrefup>0). On the other hand, when Qrefdwn≤Kvq·ΔVrms≤Qrefup, Qref=Kvq·ΔVrms is set.

Figure 3:
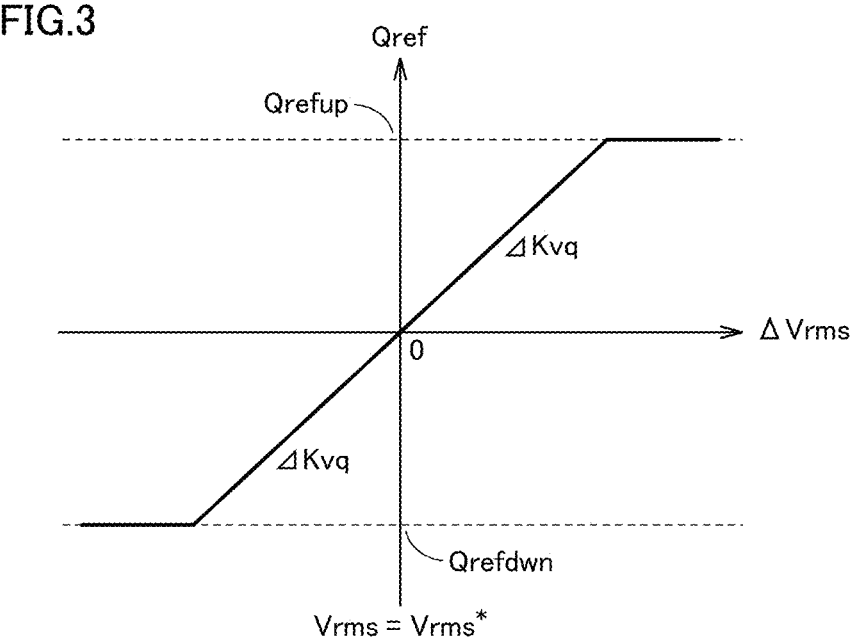
FIG. 3 is a graph showing a drooping characteristic by V-Q control according to the comparative example.

FIG. 3 shows a drooping characteristic by V-Q control in accordance with the control block diagram in FIG. 2.

The horizontal axis in FIG. 3 shows voltage deviation ΔVrms, and the vertical axis shows power command value Qref. When ΔVrms=0, that is, Vrms=Vrms*, Qref=0. When ΔVrms>0 (that is, Vrms*>Vrms), power command value Qref is set (Qref>0) such that a phase advance reactive power (the direction to rise the grid voltage) of a magnitude proportional to ΔVrms is output from power conversion device 50 to distribution grid 40. On the other hand, when ΔVrms<0 (that is, Vrms*<Vrms), power command value Qref is set (Qref<0) such that a phase delay reactive power (the direction to lower the grid voltage) of a magnitude proportional to ΔVrms is output from power conversion device 50 to distribution grid 40.

Although power command value Qref is set to be limited in the range of Qrefdmn≤Qref≤Qrefup by limiter 208 (FIG. 2), the limit values Qrefup, Qrefdwn can be determined in advance in accordance with a rated power or the like that can be output by power conversion device 50. Alternatively, in a case where power conversion device 50 can output both an active power and a reactive power, the limit values Qrefup, Qrefdwn may be variable in accordance with the output amount of active power. For example, in a case where the current amount that can be output by power conversion device 50 has a limit, a certain limit is imposed on the apparent power amount that can be output by power conversion device 50, and therefore the limit values Qrefup, Qrefdwn can be changed in accordance with the output amount of active power so that the apparent power output from power conversion device 50 is a predetermined limit value or lower. The limit values in this case can be set as desired according to the specifications and the like of power conversion device 50.

As shown in FIG. 3, the slope of a drooping characteristic is determined by proportional gain Kvq. For example, when a drooping characteristic is given from a not-shown higher-level control unit, proportional gain Kvq in FIG. 2 is determined by the slope of the specified drooping characteristic.

Figure 4:
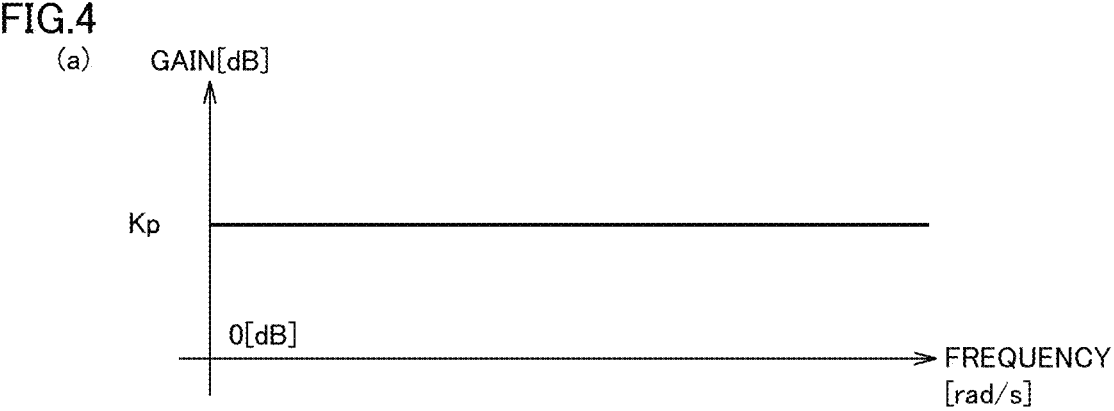
FIG. 4 is a Bode plot showing a frequency characteristic of V-Q control according to the comparative example.

FIG. 4 shows a Bode plot schematically showing a frequency characteristic of input/output response of the control block diagram shown in FIG. 2. The horizontal axis in FIG. 4(a), (b) shows frequency, the vertical axis in FIG. 4(a) shows control gain, and the vertical axis in FIG. 4(b) shows phase.

As shown in FIG. 4(a), the gain is constantly maintained to proportional gain Kvq, irrespective of the frequency. As shown in FIG. 4(b), the phase is maintained at 0 [deg] for proportional control, irrespective of the frequency.

Figure 5:
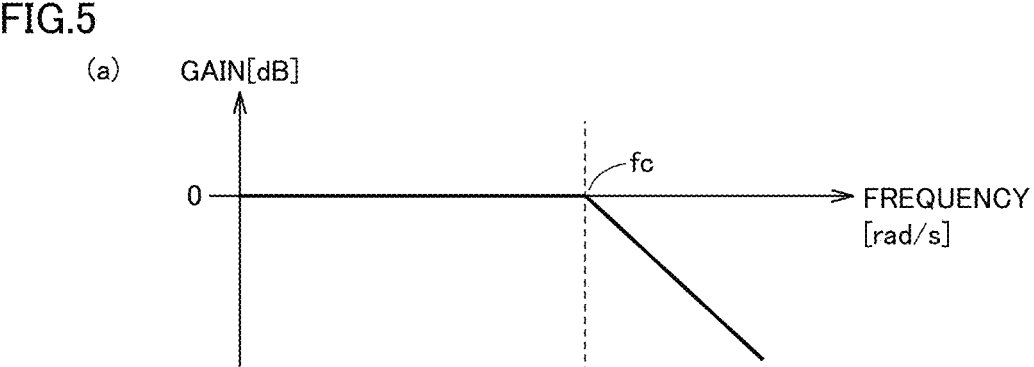
FIG. 5 is a Bode plot showing an example of a frequency characteristic of input/output response of V-Q control in a power conversion device alone.

FIG. 5 shows an example of the frequency characteristic of input/output response of V-Q control in power conversion device 50 alone. In the actual operation of power conversion device 50, there is capability limitation such that a certain response frequency is the limit before power (current) in accordance with a certain power command value is settled and output after the power command value is set. For example, such a limit is caused by, for example, a control delay due to the capability (response speed) of power conversion device 50 itself and limitations in communication interval between power conversion device 50 and grid control unit 60.

To schematically illustrate the limit in response capability, as shown in FIG. 5(a), it is assumed that the gain characteristic of V-Q control of power conversion device 50 alone has a frequency characteristic of a second order lag system. Here, suppose that the cut-off frequency at which the gain is half relative to the pass band, which corresponds to the break frequency in the frequency response of the second order lag system represented by the broken line in FIG. 5(a), is defined as an upper limit frequency fc that can avoid the limit described above. Hereinafter, the upper limit frequency is also referred to as response frequency fc of power conversion device 50. In the V-Q control of power conversion device 50 alone, the phase characteristic also changes from 0 [deg] to −180 [deg] in the vicinity of response frequency fc, as shown in FIG. 5(b).

Figure 6:
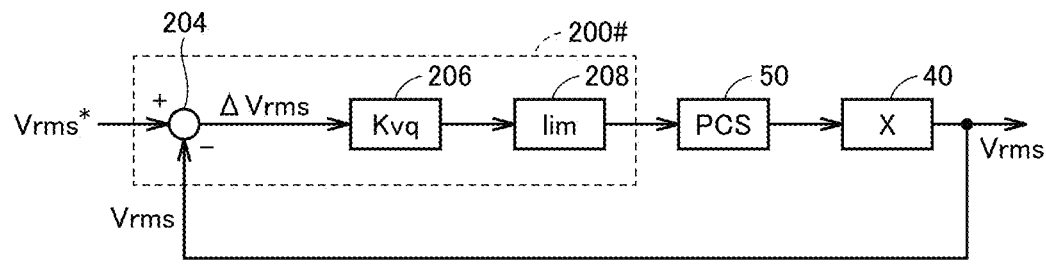
FIG. 6 is an entire control block diagram in control of a power converter using the V-Q control unit according to the comparative example.

FIG. 6 shows the entire control block diagram in control of power conversion device 50 using V-Q control unit 200 # (comparative example) in FIG. 2.

In entire control block 250 shown in FIG. 6, the block denoted by "PCS" corresponds to power conversion device 50. The power (in the first embodiment, reactive power Qx) output from power conversion device 50 causes a change in grid voltage effective value Vrms in accordance with the magnitude (X) of impedance of distribution grid 40. Grid voltage effective value Vrms is input to V-Q control unit 200 # shown in FIG. 2. V-Q control unit 200 # controls power conversion device 50 so that reactive power Qx proportional to voltage deviation ΔVrms obtained by subtracting grid voltage effective value Vrms from grid voltage command value Vrms* is output.

Figure 7:
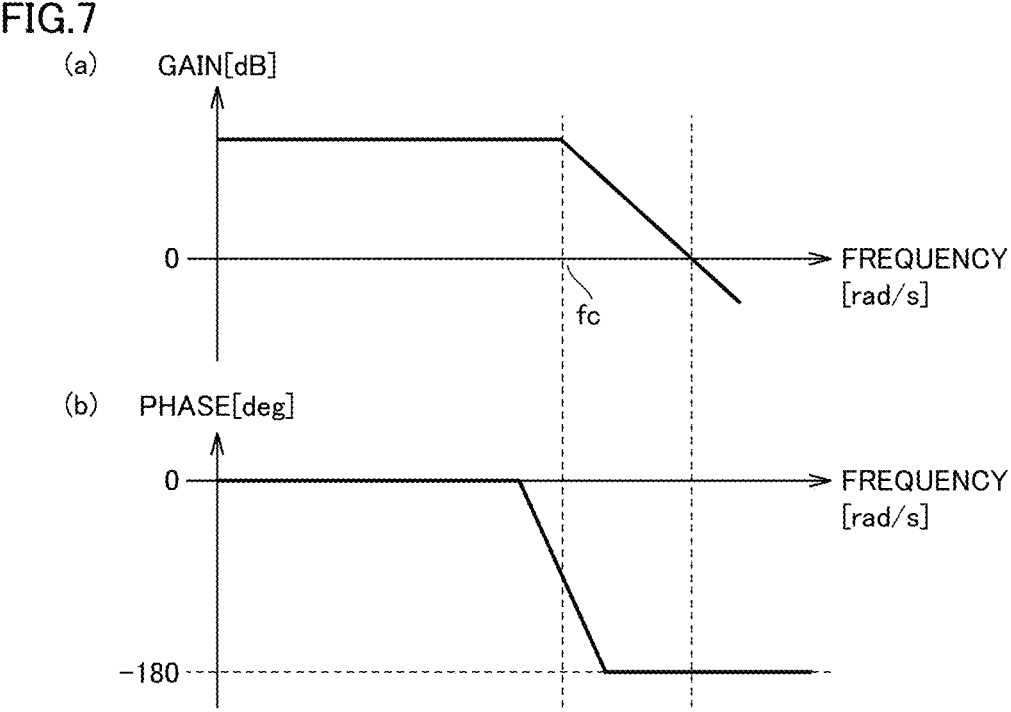
FIG. 7 is a Bode plot showing a frequency characteristic of the entire control block shown in FIG. 6.

FIG. 7 shows a Bode plot schematically showing a frequency characteristic of entire control block 250 including V-Q control unit 200 # and power conversion device 50 shown in FIG. 6. The horizontal axis in FIG. 7(a), (b) shows frequency, the vertical axis in FIG. 7(a) shows control gain, and the vertical axis in FIG. 7(b) shows phase.

As shown in FIG. 7(a), proportional gain Kvq defined according to the drooping characteristic from the higher level is determined, whereby the control gain is maintained at a constant value dependent on the proportional gain Kvq in a frequency range equal to or lower than response frequency fc. On the other hand, as shown in FIG. 7(b), the phase changes from 0 [deg] to −180 [deg] in the vicinity of response frequency fc, in the same manner as in FIG. 5(b).

As can be understood from FIG. 7(b), in the V-Q control of power conversion device 50 to which the V-Q control (FIG. 2) of the comparative example is applied, the control gain is maintained at a constant value dependent on proportional gain Kvq, even in the vicinity of response frequency fc.

Thus, when proportional gain Kvq is set to be too high by the drooping characteristic, the phase margin or gain margin of control decreases, which may deteriorate the control stability in the entire V-Q control shown in FIG. 6.

When grid voltage variations are suppressed by power conversion device 50, stabilization of the grid voltage is emphasized, and the drooping characteristic is set such that a reactive power equivalent to the rated output of power conversion device 50 is output for a voltage variation as small as ±1(%) or lower of the grid voltage. Thus, proportional gain Kvq may be set to be large in order to ensure the slope of the drooping characteristic of V-Q control. Accordingly, control stability may be reduced as described above in the vicinity of response frequency fc. Conversely, if control stability is emphasized and proportional gain Kvq is limited, the performance of grid voltage stabilizing control is limited.

Figure 8:
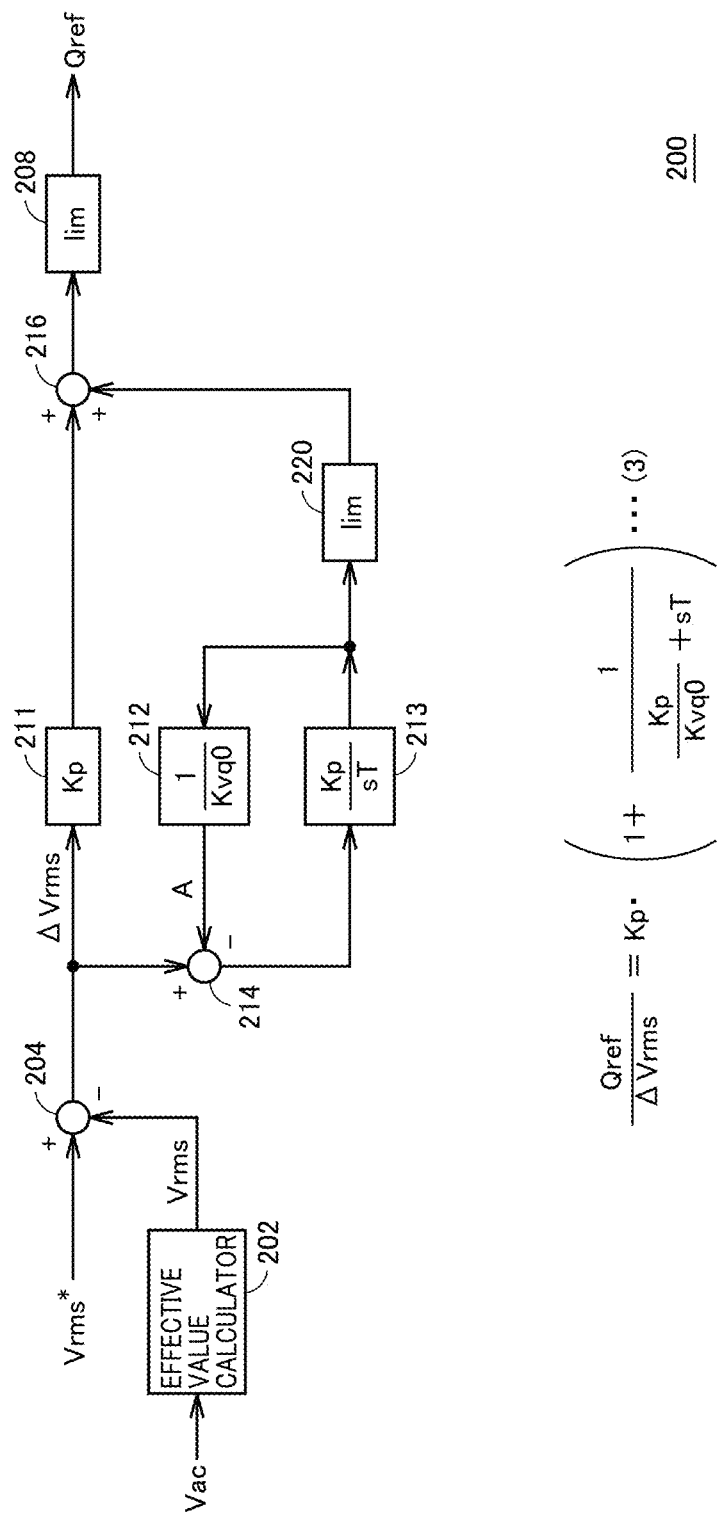
FIG. 8 is a control block diagram of a V-Q control unit according to the first embodiment.

In the present first embodiment, therefore, in entire control block 250 shown in FIG. 6, grid control unit 60 is configured such that V-Q control unit 200 # according to the comparative example is replaced by V-Q control unit 200 shown in FIG. 8.

Entire control block 250 shown in FIG. 6 is simplified for the sake of brevity of the spirit of the present disclosure and described only by way of example. That is, it should be noted that the application of the present disclosure is not limited to the configuration using V-Q control unit 200 shown in FIG. 8, instead of V-Q control unit 200 #, in entire control block 250 shown in FIG. 6.

As shown in FIG. 8, V-Q control unit 200 according to the first embodiment includes effective value calculator 202, subtractor 204, and limiter 208 similar to those in FIG. 2, and proportional control elements 211, 212, an integral control element 213, a subtractor 214, an adder 216, and a limiter 220.

Proportional control element 211 outputs a multiplication value of voltage deviation ΔVrms and proportional gain Kp. Voltage deviation ΔVrms is input to the (+) side of subtractor 214.

Integral control element 213 integrates the multiplication value of the output of subtractor 214 and the integral gain (Kp/T) (T: integral time). The integral value that is the output of integral control element 213 is multiplied by a gain (1/Kvq0) by proportional control element 212 and set as an input value A to the (−) side of subtractor 214. Limiter 220 has a function similar to that of limiter 208 and is provided for limiting the integral value by integral control element 213 to within the above range of Qrefdwn to Qrefup.

Adder 216 adds the output value of proportional control element 211 (Kp) and the integral value by integral control element 213 (after passing through limiter 220). In V-Q control unit 200, the output value of adder 216 passes through limiter 208, whereby power command value Qref is generated. That is, power command value Qref is set so as to be limited within the range of Qrefdown≤Qref≤Qrefup.

In FIG. 8, when limiters 208, 220 are omitted, the control computation between input ΔVrms and output Qref can be expressed by the following equation (1) using the input value A to subtractor 214.

$$(\Delta Vrms - A) \cdot (Kp/sT) + \Delta Vrms \cdot Kp = Qref \quad (1)$$

For the input value A, the following equation (2) holds.

$$(\Delta Vrms - A) \cdot (Kp/sT) \cdot (1/Kvq0) = A \quad (2)$$

A system of equations (1) and (2) is solved for (Qref/ΔVrms) by eliminating the input value A to yield the following equation (3), which is also shown in FIG. 8, for the control computation in V-Q control unit 200.

$$\frac{Qref}{\Delta Vrms} = Kp \cdot \left(1 + \frac{1}{\frac{Kp}{Kvq0} + sT}\right) \quad (3)$$

In equation (3), it is understood that when s→0, that is, the frequency is brought closer to zero, (Qref/ΔVrms)=Kp+Kvq0. Conversely, it is understood that when s→∞, that is, the frequency is increased, (Qref/ΔVrms)=Kp. Therefore, with Kp<Kvq0, the gain in the high frequency range can be made lower than the gain in the low frequency range.

Figure 9:
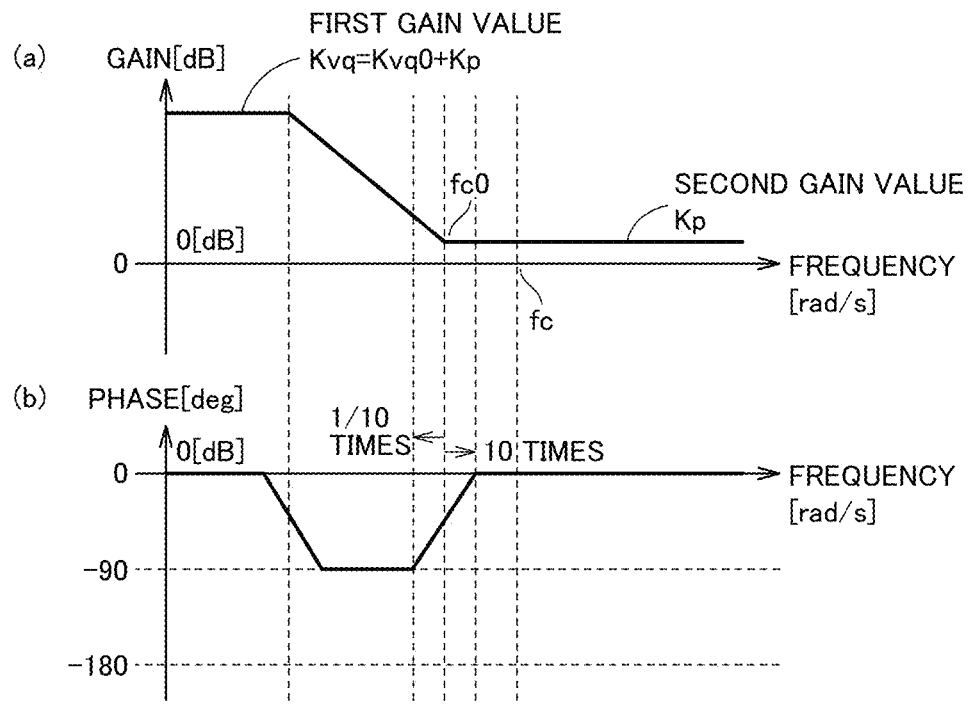
FIG. 9 is a Bode plot showing a frequency characteristic of the V-Q control unit according to the first embodiment.

FIG. 9 shows a Bode plot schematically showing the frequency characteristic of input/output response of V-Q control unit 200 shown in FIG. 8, that is, the frequency characteristic of V-Q control according to the first embodiment. The horizontal axis in FIG. 9(a), (b) shows frequency, the vertical axis in FIG. 9(a) shows control gain, and the vertical axis in FIG. 9(b) shows phase, in the same manner as in FIG. 4.

As shown in FIG. 9, since the proportional control is dominant in the low frequency range (s→0), the control gain is a first gain value indicated by Kvq=Kp0+Kp and the phase is 0 [deg] (no phase lag). On the other hand, when the frequency increases from the low frequency range, the influence of integral control increases, the control gain decreases from the first gain value, and the phase decreases toward −90 [deg]. Therefore, in the low frequency range including direct current (0 [Hz]), the control gain can be set to the first gain value Kvq. That is, first gain value Kvq corresponds to an example of "first control gain value", and the low frequency range including direct current corresponds to an example of "first frequency range". It is preferable that the above low frequency range in which the control gain is set to first gain value Kvq includes a frequency indicated by a reciprocal of a target value (approximately a few tens of seconds to a few hundreds of seconds) of the settling time of the grid voltage control.

When the frequency further increases, the integral control is dominant in the frequency range, and the phase is −90 [deg]. Even in this frequency range, the control gain decreases with increase of frequency.

In the high frequency range (s→∞), the control gain decreases to Kp (second gain value), the proportional control is dominant again, and the phase is 0 [deg]. Broken line frequency fc0 that is the lower limit frequency where control gain=Kp is determined depending on integral time T in integral control element 213.

In order to reduce the control gain at response frequency fc of power conversion device 50 as illustrated in FIG. 5 and FIG. 7, it is preferable that integral time T is set so that fc0<fc. In this case, since the control gain value at response frequency fc is Kp, second gain value Kp corresponds to an example of "second control gain value", and second gain value Kp is set.

Alternatively, if the control gain value at response frequency fc is within a range sufficiently lower than the first gain value (Kvq), fc0>fc can be permitted, and integral time T can be set so that, for example, broken line frequency fc0 is located within the range of fc0<5·fc, as a minimum requirement. In this case, the control gain at response frequency fc that is larger than gain Kp and smaller than gain Kvq corresponds to an example of "second gain value". In either case, it is understood that "second frequency range" in which the control gain value is set to "second gain value" includes response frequency fc.

Gain Kvq (first gain value) in the low frequency range corresponds to the slope of the drooping characteristic similar to that in FIG. 3. Therefore, gains Kp and Kvq0 in FIG. 8 are defined as a value in grid control unit 60 in association with the slope of the obtained drooping characteristic.

In grid control unit 60, the gain (1/Kvq0) of proportional control element 212 can be defined by setting Kvq0=Kvq−Kp using the preset gain Kp and the slope Kvq of the drooping characteristic specified by the higher level. When Kvq>>Kp, Kvq≈(Kvq0+Kp), and then in grid control unit 60, Kvq0=Kvq can be readily set using the slope Kvq of the drooping characteristic specified by the higher level as it is.

Figure 10:
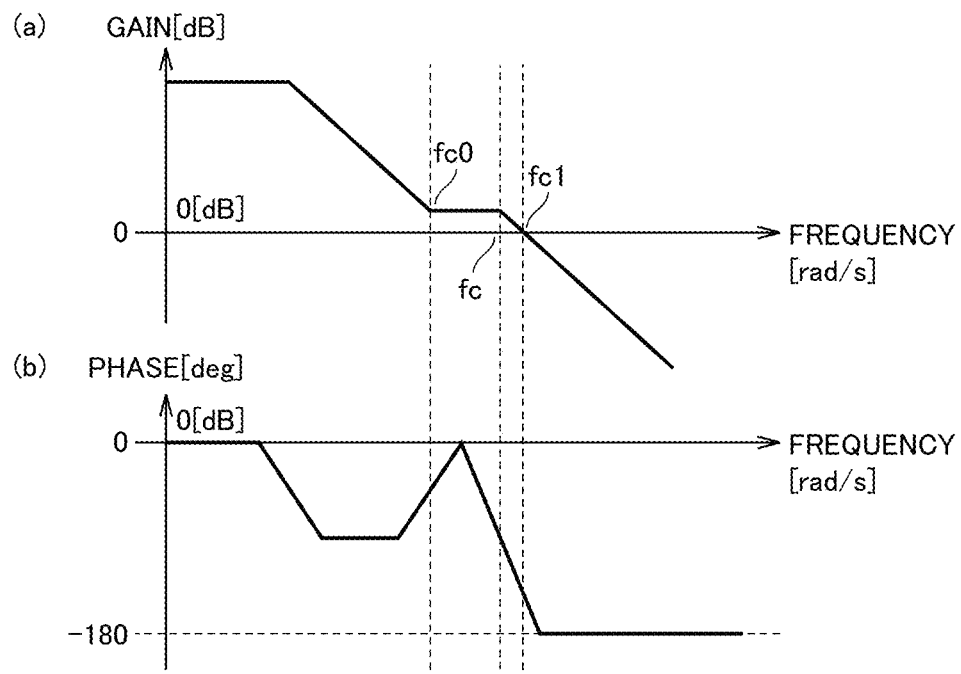
FIG. 10 is a Bode plot showing a frequency characteristic in control of the power converter using the V-Q control unit according to the first embodiment.

FIG. 10 shows the frequency characteristic of the entire control block including V-Q control unit 200 shown in FIG. 8 and power conversion device 50. Specifically, a Bode plot is shown to schematically illustrate the frequency characteristic when V-Q control unit 200 according to the first embodiment is applied instead of V-Q control unit 200 # of the comparative example in entire control block 250 in FIG. 6. The horizontal axis in FIG. 10(a), (b) shows frequency, the vertical axis in FIG. 10(a) shows control gain, and the vertical axis in FIG. 10(b) shows phase, in the same manner as in FIG. 7.

As shown in FIG. 10(a), in the above low frequency range including direct current (0 [Hz]), the control gain is a value dependent on first gain value Kvq. Thus, a control gain equivalent to that in FIG. 7 for ensuring the slope (Kvq) of the drooping characteristic can be ensured. As a result, the drooping characteristic shown in FIG. 3 can be implemented similarly.

On the other hand, the control gain in the high frequency range including response frequency fc decreases to a value dependent on second gain value Kp. As a result, in the frequency range in the vicinity of response frequency fc of power conversion device 50 that is higher than broken line frequency fc0 shown in FIG. 9, the control gain is a value dependent on second gain value Kp and can be kept lower than a value dependent on first gain value Kvq in the low frequency range.

In the frequency range higher than response frequency fc, the control gain decreases as the frequency increases. In particular, the control gain is 0 [dB] at gain crossover frequency fc1 determined in connection with the frequency characteristic of power conversion device 50 (FIG. 5), the characteristic of V-Q control unit 200, and impedance X of the distribution grid.

In this way, in the grid system to which the V-Q control according to the first embodiment is applied, a desired drooping characteristic can be imparted without impairing the control stability in the vicinity of response frequency fc. That is, it is understood that the set drooping characteristic can be imparted without impairing the control stability.

In the first embodiment, voltage measuring units 52a, 52b and current measuring units 54a, 54b shown in FIG. 1 and the like correspond to an example of "detector" for detecting a state quantity of distribution grid 40, and grid control units 60a, 60b correspond to an example of "control device" of the grid system. In the first embodiment, grid voltage effective value Vrms corresponds to "state quantity" of distribution grid 40. Further, in the control block diagram shown in FIG. 8, effective value calculator 202 and subtractor 204 of V-Q control unit 200 correspond to an example of "deviation computation unit", and the elements downstream of subtractor 204 of V-Q control unit 200 constitute an example of "control computation unit".

The configuration of V-Q control unit 200 shown in FIG. 8 is illustrated only by way of example, and the control computation by V-Q control unit 200 can be set as desired as long as the frequency characteristics in the low frequency range including direct current (0 [Hz]) and the high frequency range including response frequency fc described with reference to FIG. 9, are implemented.

Modifications of First Embodiment

In a modification of the first embodiment, V-Q control in which a dead band is provided for a small change of grid voltage as in PTL 1 will be described.

Figure 11:
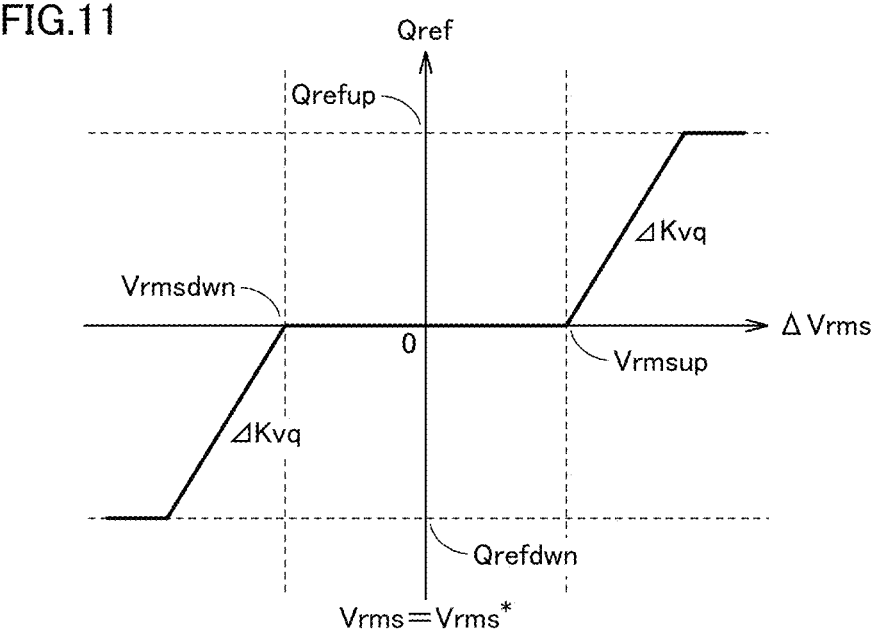
FIG. 11 is a graph showing a drooping characteristic by V-Q control according to a modification of the first embodiment.

FIG. 11 shows a drooping characteristic by V-Q control according to a modification of the first embodiment.

In FIG. 11 compared with FIG. 3, in a modification of the first embodiment, when a change of grid voltage effective value Vrms relative to grid voltage command value Vrms* is small, for example, in the range of Vrmsdwn≤ΔVrms≤Vrmsup (Vrmsdwn<0, Vrmsup>0), Qref=0 is set, and V-Q control is performed so that a reactive power is not injected from power conversion device 50 into distribution grid 40.

On the other hand, in the region of ΔVrms>Vrmsup, power command value Qref is set in accordance with the product of slope Kvq similar to that of FIG. 3 and voltage deviation ΔVrmsup so that a phase advance reactive power (voltage rising direction) of a magnitude proportional to voltage deviation ΔVrmsu (ΔVrmsu=Vrms*−Vrms−Vrmsup) is injected into distribution grid 40 (Qref=Kvq·ΔVrmsu).

In the region of ΔVrms<Vrmsdwn, power command value Qref is set in accordance with the product of slope Kvq similar to that of FIG. 3 and voltage deviation ΔVrmsd so that a phase delay reactive power (voltage lowering direction) of a magnitude proportional to voltage deviation ΔVrmsd (ΔVrmsd=Vrms*−Vrms−Vrmsdwn) is injected into distribution grid 40 (Qref=Kvq·ΔVrmsd).

That is, in the region of ΔVrms>Vrmsup and the region of ΔVrms<Vrmsdwn, V-Q control is performed in accordance with the drooping characteristic having slope Kvq similar to that of FIG. 3.

Figure 12:
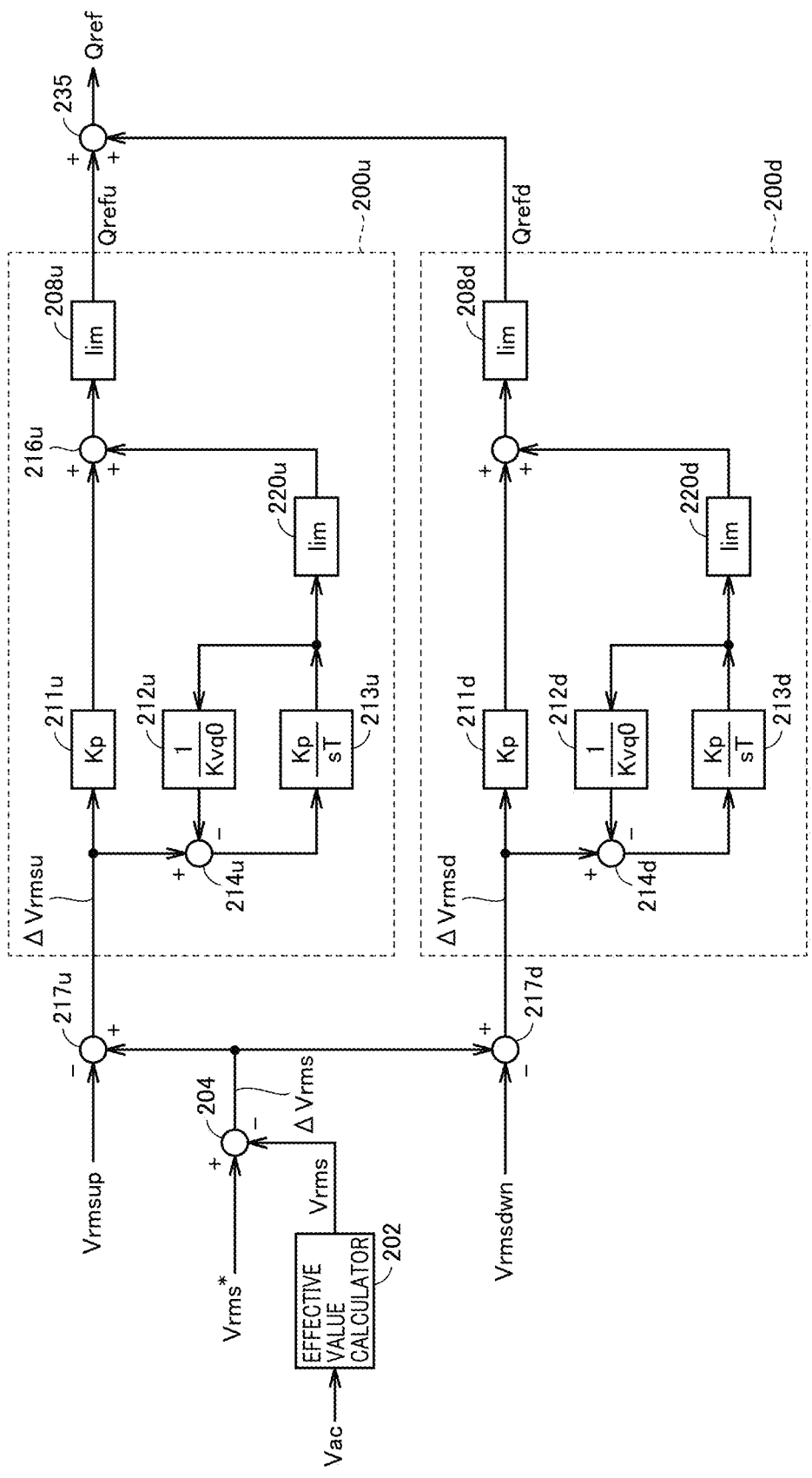
FIG. 12 is a control block diagram of the V-Q control unit according to a modification of the first embodiment.

FIG. 12 shows a control block diagram of the V-Q control unit according to a modification of the first embodiment.

As shown in FIG. 12, a V-Q control unit 201 according to a modification of the first embodiment includes effective value calculator 202, subtractor 204, a V-Q control unit 200u on the voltage rising side, a V-Q control unit 200d on the voltage lowering side, correctors 217u, 217d, and an adder 235.

Corrector 217u calculates a corrected voltage deviation ΔVrmsu by subtracting Vrmsup (>0) in FIG. 11 from voltage deviation ΔVrms from subtractor 204. As a result, in the region of 0<ΔVrms<Vrmsup, voltage deviation ΔVrms is a positive value, whereas voltage deviation ΔVrmsu is corrected to a negative value.

Similarly, corrector 217d calculates a corrected voltage deviation ΔVrmsd by subtracting Vrmsdwn (<0) in FIG. 11 from voltage deviation ΔVrms from subtractor 204. As a result, in the region of Vrmsdwn<ΔVrms<0, voltage deviation ΔVrms is a negative value, whereas voltage deviation ΔVrmsd is corrected to a positive value.

V-Q control unit 200u includes limiters 208u, 220u, proportional control elements 211u, 212u, an integral control element 213u, a subtractor 214u, and an adder 216u, which are connected in the same manner as limiters 208, 220, proportional control elements 211, 212, integral control element 213, subtractor 214, and adder 216 of V-Q control unit 200 in FIG. 8.

However, limiters 208u, 220u are configured to limit an output value to within the range of 0 to Qrefup (Qrefup>0). That is, when a negative value is input to limiters 208u, 220u, an output value of limiters 208u, 220u is zero.

V-Q control unit 200u receives the corrected voltage deviation ΔVrmsu and outputs Qrefu. Through the operation of limiters 208u, 220u described above, when voltage deviation ΔVrmsu<0, that is, ΔVrms<Vrmsup, output value Qrefu of V-Q control unit 200u is 0.

On the other hand, when voltage deviation ΔVrmsu≥0, the output value Qrefu of V-Q control unit 200u is >0 in accordance with voltage deviation ΔVrmsu. The relation between voltage deviation ΔVrmsu and output value Qrefu in this case is similar to the relation between voltage deviation ΔVrms and power command value Qref in V-Q control unit 200 (FIG. 8).

Similarly, V-Q control unit 200d includes limiters 208d, 220d, proportional control elements 211d, 212d, an integral control element 213d, a subtractor 214d, and an adder 216d, which are connected in the same manner as limiters 208, 220, proportional control elements 211, 212, integral control element 213, subtractor 214, and adder 216 of V-Q control unit 200 in FIG. 8.

However, limiters 208d, 220d are configured to limit the output value to within the range of Qrefdwn to 0 (Qrefdwn<0). That is, when a positive value is input to limiters 208u, 213u, an output value of limiters 208d, 220d is zero.

V-Q control unit 200d receives the corrected voltage deviation ΔVrmsd and outputs Qrefd. Through the operation of limiters 208d, 220d, when voltage deviation ΔVrmsd>0, that is, ΔVrms>Vrmsdwn, the output value Qrefd of V-Q control unit 200d is 0.

On the other hand, when voltage deviation ΔVrmsd≤0, output value Qrefd of V-Q control unit 200d is <0 in accordance with voltage deviation ΔVrmsd. The relation between voltage deviation ΔVrmsd and output value Qrefd in this case is similar to the relation between voltage deviation ΔVrms and power command value Qref in V-Q control unit 200 (FIG. 8).

Adder 235 adds output value Qrefu of V-Q control unit 200u and output value Qrefd of V-Q control unit 200d to generate power command value Qref. As described above, in the range of Vrmsdwn≤ΔVrms≤Vrmsup shown in FIG. 11, Qrefu=Qrefd=0 and therefore power command value Qref=0 is set. As a result, the region in which a change of grid voltage relative to grid voltage command value Vrms* is small, where Vrmsdwn≤ΔVrms≤Vrmsup, can be set as a dead band in which a reactive power is not injected into distribution grid 40.

On the other hand, in the outside of the dead band, power command value Qref can be set in such a manner that voltage deviation ΔVrms is replaced by the corrected voltage deviation ΔVrmsu or ΔVramsd in V-Q control unit 200 in FIG. 8.

In this way, in the system in which the V-Q control according to the modification of the first embodiment is applied, a dead band is provided in a region in which a change of grid voltage is small, and in the outside of the dead band, V-Q control can be performed in the same manner as in the first embodiment. Therefore, in addition to the effect by the V-Q control according to the first embodiment, control stability can be further improved in a region in which a change of grid voltage is small.

A modification of the configuration of the grid system will now be described.

In FIG. 1, a configuration example in which each of two power conversion devices 50a, 50b disposed in proximity to each other performs control (V-Q control) for providing a drooping characteristic has been described. However, only one of two power conversion devices 50a, 50b may perform V-Q control according to the first embodiment.

However, in the configuration as shown in FIG. 1, a control error may be caused by a sensor error or the like, and an output share may become uneven between power conversion devices 50a and 50b. In this respect, a drooping characteristic is provided in both of power conversion devices 50a and 50b so that such an uneven output share can be suppressed.

Figure 13:
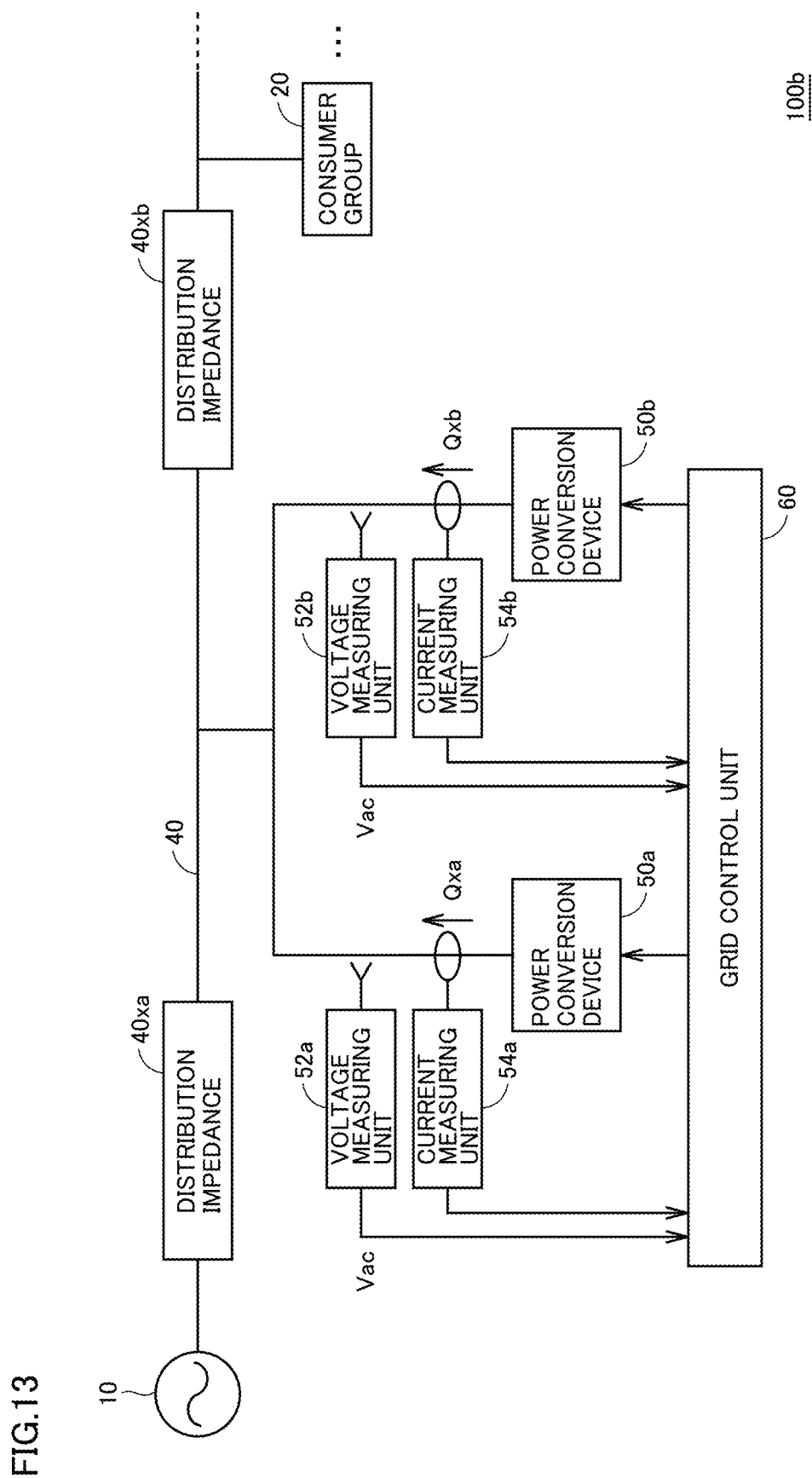
FIG. 13 is a block diagram illustrating a first modification of a configuration of the grid system.

Furthermore, a system configuration like a grid system 100b shown in FIG. 13 may be employed, in which the functions of grid control units 60a, 60b shown in FIG. 1 are integrated into grid control unit 60 provided in common to power conversion devices 50a, 50b. Grid control unit 60 may be integrated into an upper-level control unit that sets the slope of a drooping characteristic. In this case, the slope (Kvq) of the drooping characteristic set in grid control unit 60 is used to generate a command value of power conversion devices 50a, 50b for power control (V-Q control) according to the present embodiment.

Figure 14:
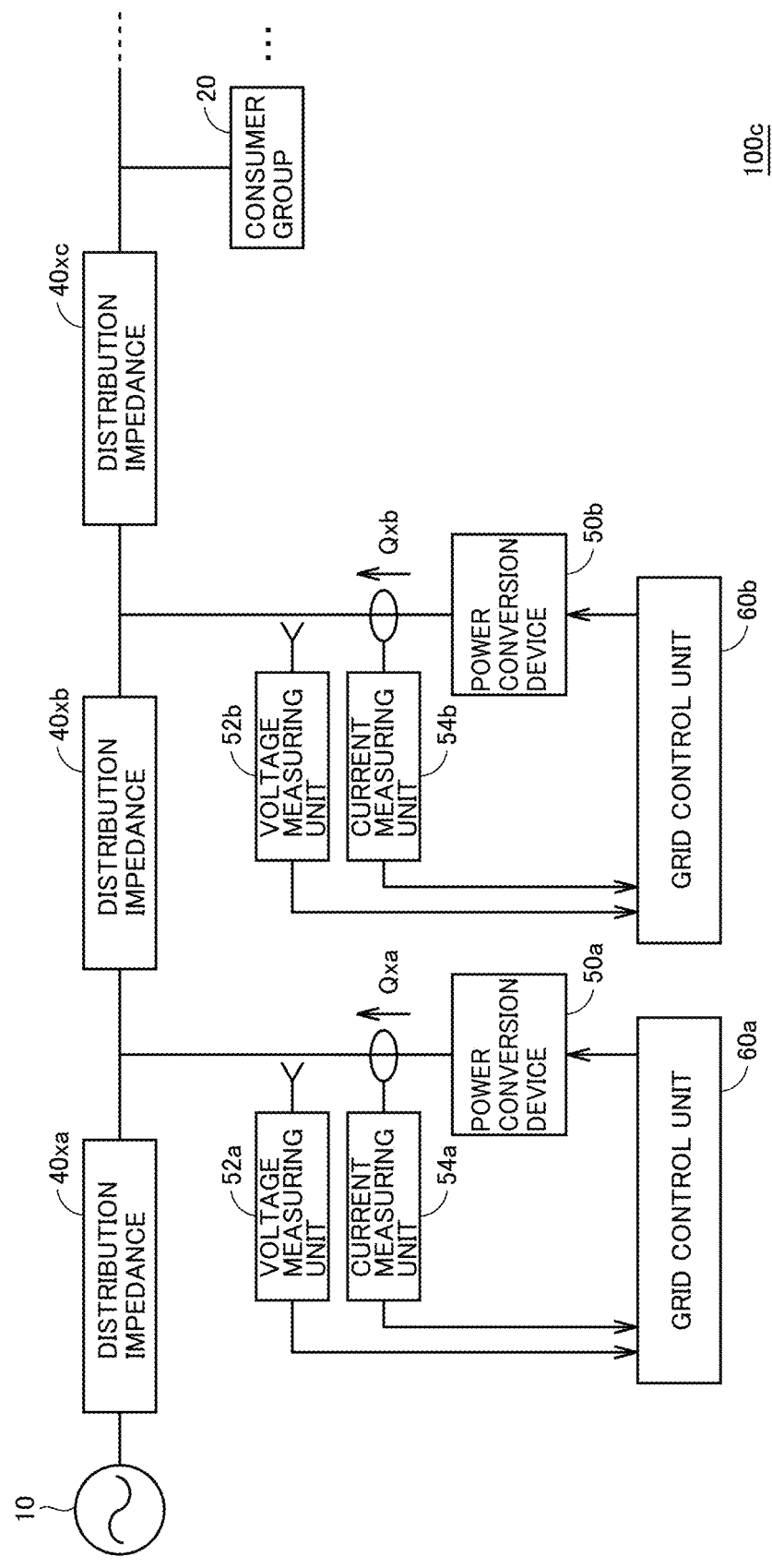
FIG. 14 is a block diagram illustrating a second modification of a configuration of the grid system.

Alternatively, in a grid system 100c shown in FIG. 14, power control (V-Q control) according to the present embodiment may be executed in power conversion devices 50a, 50b individually connected to separate locations on distribution grid 40.

Figure 15:
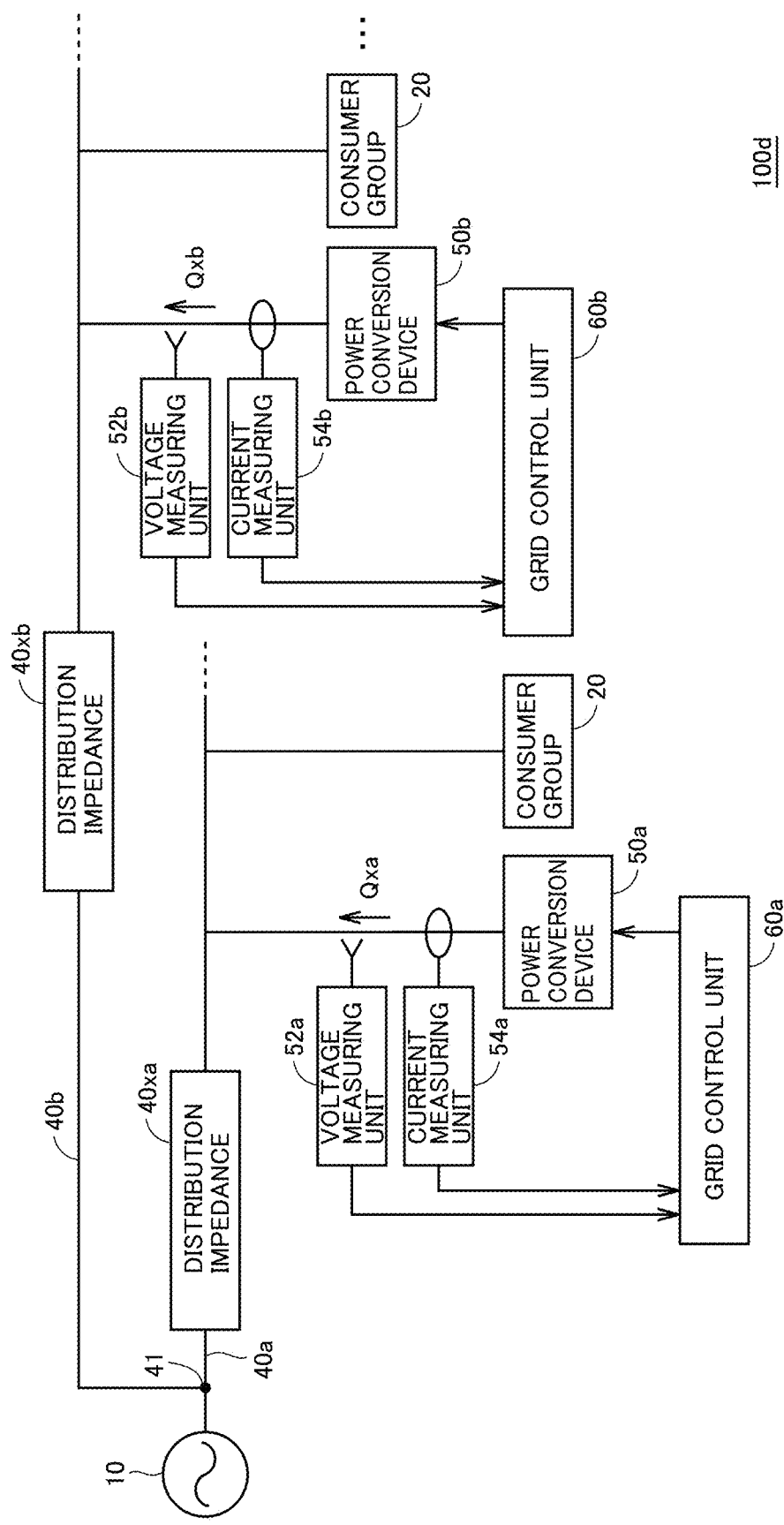
FIG. 15 is a block diagram illustrating a third modification of a configuration of the grid system.

Alternatively, in a grid system 100d shown in FIG. 15, power control (V-Q control) according to the present embodiment may be executed in power conversion devices 50a, 50b connected to different distribution grids 40a, 40b, respectively.

In FIG. 1 and FIG. 13 to FIG. 15, power control (V-Q control) by two power conversion devices 50a, 50b has been described, but one or three or more power conversion devices 50 may be connected to any locations on a distribution grid. That is, the power control according to the present embodiment can be executed in any number of power conversion devices 50 connected to a distribution grid.

Second Embodiment

In a second embodiment, active power control (f-P) for a change of grid frequency will be described as grid stabilizing control.

Figure 16:
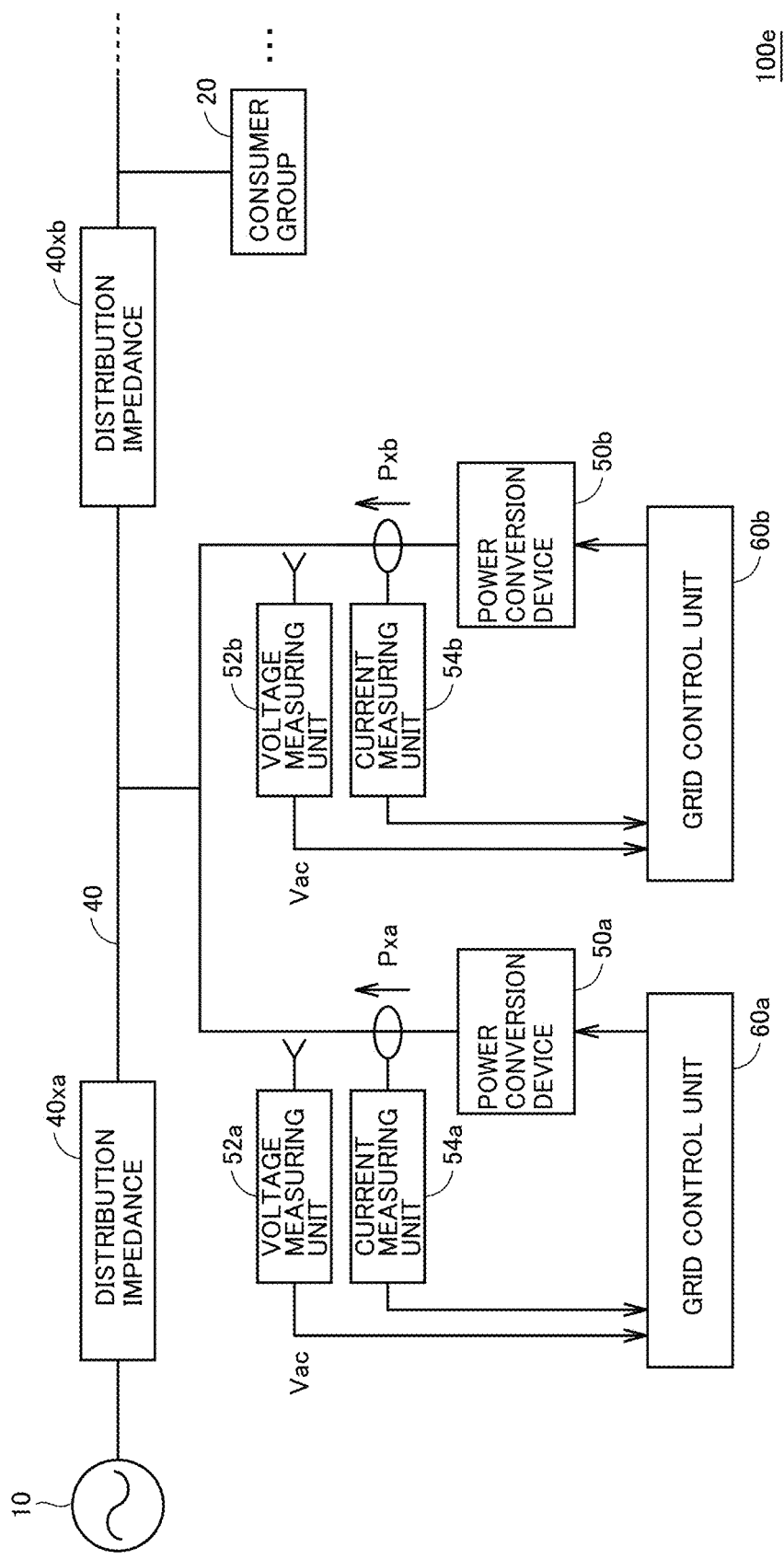
FIG. 16 is a block diagram illustrating a schematic configuration of a grid system according to a second embodiment.

As shown in FIG. 16, a grid system 100e according to the second embodiment is configured in the same manner as grid system 100a (FIG. 1) and includes a voltage source device 10, a distribution grid 40 including a transmission line, power conversion devices 50a, 50b, voltage measuring units 52a, 52b, current measuring units 54a, 54b, and grid control units 60a, 60b.

In general, voltage source device 10 has a rotation element that stores kinetic energy of rotation motion, such as a rotor of a power generator. Thus, in voltage source device 10, when an instantaneous power balance is lost, the operation of keeping a power balance by changing kinetic energy of the rotation element is performed. For example, when consumed power in consumer group 20 and the like is greater than the power that can be supplied by voltage source device 10, voltage source device 10 extracts part of the kinetic energy of the rotation element as power that can be supplied and supplies the power to consumer group 20. As a result, rotation kinetic energy of the rotation element decreases, so that the rotation speed of the rotation element decreases, and the change in rotation speed appears as a frequency change in grid voltage. Conversely, when the consumed power in consumer group 20 and the like is smaller than the power that can be supplied by voltage source device 10, the rotation speed of the rotation element increases, so that the change in rotation speed appears as a frequency change (increase) of the grid voltage.

Whether a frequency change occurs in this way depends on the balance between the supply capability of voltage source device 10 and the consumed power in consumers and the like. In the second embodiment, it is assumed that voltage source device 10 is characterized in that the grid frequency of distribution grid 40 changes in accordance with a power share.

In the second embodiment, power conversion devices 50a, 50b are configured to input/output active powers Pxa, Pxb to/from distribution grid 40 in accordance with a power command value from grid control units 60a, 60b. Power conversion devices 50a, 50b use an inverter or the like connected to demand and supply adjusting means including a power storage device (battery, etc.) such as a battery so that both of input and output of active power is possible.

In the second embodiment, grid control units 60a, 60b generate a power command value Pref of active power, based on a state of distribution grid 40 measured by voltage measuring units 52a, 52b and current measuring units 54a, 54b (specifically, grid voltage and/or grid current).

In the following, it is assumed that the active power in a direction in which it is output from power conversion device 50 to distribution grid 40 is represented by a positive value, while the active power in a direction in which it is output from distribution grid 40 to power conversion device 50 is represented by a negative value. According to the above definition, Pref>0 is to specify an output of active power to distribution grid 40 (a direction to increase the frequency, Pxa, Pxb>0), and Pref<0 is to specify outflow of active power from distribution grid 40 (a direction to decrease the frequency, Pxa, Pxb<0). The other configuration of FIG. 16 is similar to that of FIG. 1 and will not be further elaborated.

The conventional f-P control described in PTL 1 and the like will be described as a comparative example with reference to FIG. 17 to FIG. 22.

Figure 17:
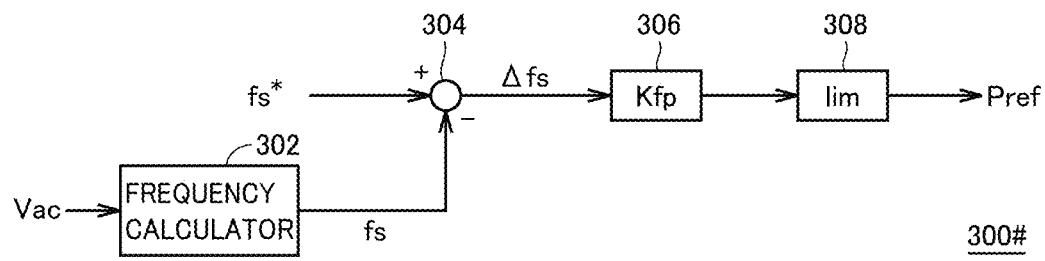
FIG. 17 is a control block diagram of a f-P control unit according to a comparative example.

As shown in FIG. 17, a P-Q control unit 300# according to the comparative example is executed by a frequency calculator 302, a subtractor 304, a proportional control element 306, and a limiter 308. Frequency calculator 302 calculates a grid frequency fs from the waveform of grid voltage Vac measured by voltage measuring unit 52.

Subtractor 304 calculates a frequency deviation Δfs by subtracting grid frequency fs calculated by frequency calculator 302 front a grid frequency command value fs* that is a grid frequency control target. Proportional control element 306 outputs a multiplication value of frequency deviation Δfs and proportional gain Kfp. An output value of proportional control element 306 passes through limiter 308 whereby power command value Pref is generated.

Limiter 208 fixes Pref=Prefup when Kfp·Δfs>Prefup and fixes Pref=Prefdwn when Kfp·Δfs<Prefdwn (Prefdown<0, Prefup>0). On the other hand, when Prefdwn≤Kfp·Δfs≤Prefup, Pref=Kfp·Δfs is set.

Thus, a drooping characteristic is provided by the P (proportional) control similar to the V-Q control according to the comparative example.

Figure 18:
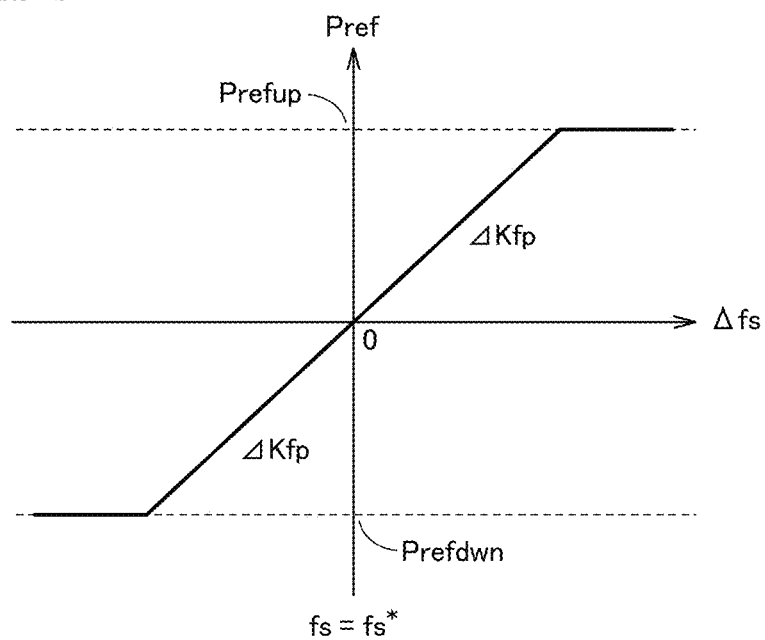
FIG. 18 is a graph showing a drooping characteristic by f-P control according to the comparative example.

As shown in FIG. 18, power command value Pref shown on the vertical axis is proportional to frequency deviation Δfs shown on the horizontal axis, whereby a drooping characteristic determined by proportional gain Kvq is implemented. That is, proportional gain Kfp in FIG. 17 can be determined by the slope of the drooping characteristic given by a not-shown higher-level control unit.

With this drooping characteristic, when Δfs>0 (that is, fs*>fs), power command value Pref is set (Pref>0) such that an active power of a magnitude proportional to Δfs is output from power conversion device 50 to distribution grid 40. On the other hand, when Δfs<0 (that is, fs*<fs), power command value Pref is set (Pref<0) such that an active power of a magnitude proportional to Δf is input from distribution grid 40 to power conversion device 50.

Power command value Pref is set by limiter 308 (FIG. 17) to be limited to within the range of Prefdmn≤Pref≤Prefup, and the limit values Prefup, Prefdwn can also be determined in advance in accordance with a rated power or the like that can be output by power conversion device 50. Alternatively, when power conversion device 50 can output both of an active power and a reactive power, the limit values Prefup, Prefdwn may be changed in accordance with the output amount of reactive power so that the apparent power does not exceed a certain limit value.

FIG. 19 shows a Bode plot similar to FIG. 4. As shown in FIG. 19(*a*), the gain is constantly maintained to proportional gain Kfp, irrespective of the frequency. As shown in FIG. 19(*b*), the phase is maintained at 0 [deg] for proportional control, irrespective of the frequency.

FIG. 20 shows an example of the frequency characteristic of input/output response of f-P control in power conversion device 50 alone. FIG. 20 corresponds to the Bode plot shown in FIG. 5 in V-Q control.

As shown in FIG. 20(*a*), even in f-P control, upper limit frequency fc similar to that described in FIG. 5(*a*) exists in the gain characteristic of power conversion device 50 alone, due to a delay time in the actual operation of power conversion device 50. Further, as shown in FIG. 20(*b*), in the phase characteristic, 0 [deg] changes to −180 [deg] in the vicinity of response frequency fc, in the same manner as in FIG. 5(*b*).

Response frequency fc in the first and second embodiments is denoted by the same reference sign, but actually, the value of response frequency fc may be different between V-Q (first embodiment) and f-P control (second embodiment).

Figure 21:
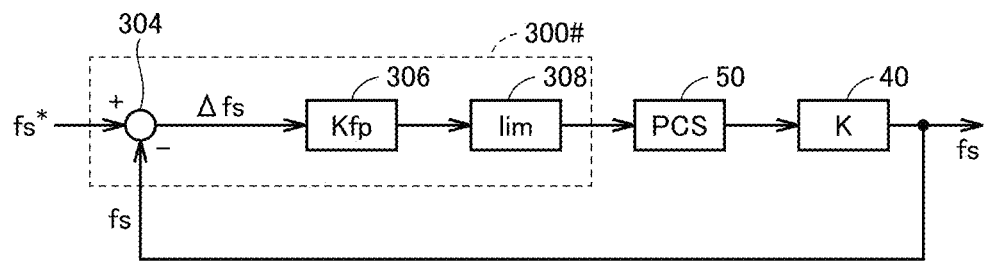
FIG. 21 is an entire control block diagram in control of a power converter using the f-P control unit according to the comparative example.

FIG. 21 shows the entire control block diagram, similar to FIG. 6, in control of power conversion device 50 using f-P control unit 300 # (comparative example) in FIG. 17.

Grid frequency fs is input to f-P control unit 300 # shown in FIG. 17. The f-P control unit 300 # controls power conversion device (PCS) 50 so that an active power Px proportional to frequency deviation Δfs obtained by subtracting grid frequency fs from grid frequency command value fs* is output. The power output from power conversion device 50 (in the second embodiment, active power Px) has grid frequency fs changed in accordance with grid frequency-active power characteristic (K) in distribution grid 40.

Figure 22:
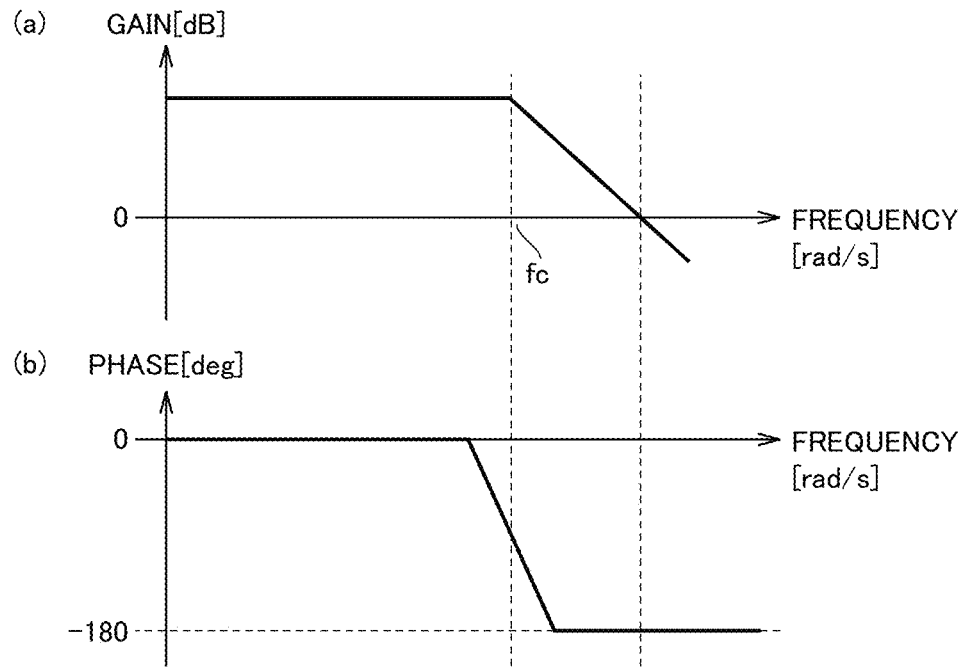
FIG. 22 is a Bode plot showing a frequency characteristic of the entire control block shown in FIG. 21.

FIG. 22 shows a Bode plot schematically showing a frequency characteristic of an entire control block 350 including f-P control unit 300 # and power conversion device 50 shown in FIG. 21.

As shown in FIG. 22(*a*), proportional gain Kfp defined in accordance with the drooping characteristic from the higher level is determined, whereby the control gain is maintained at a constant value dependent on the proportional gain Kfp in a frequency range equal to or lower than response frequency fc. On the other hand, as shown in FIG. 22(*b*), the phase changes from 0 [deg] to −180 [deg] in the vicinity of response frequency fc, in the same manner as in FIG. 20(*b*).

As can be understood from FIG. 22(*b*), in the f-P control of power conversion device 50 to which the f-P control (FIG. 17) of the comparative example is applied, the control gain is maintained at a constant value dependent on proportional gain Kfp, even in the vicinity of response frequency fc.

Thus, when proportional gain Kfp is set to be too high by the drooping characteristic, the phase margin or gain margin in control decreases, which may deteriorate the control stability in the entire f-P control shown in FIG. 21.

When grid frequency variations are suppressed by power conversion device 50, stabilization of grid frequency is emphasized, and the drooping characteristic is set such that a reactive power equivalent to the rated power of power conversion device 50 can be output for a small variation of grid frequency. Thus, proportional gain Kfp may be set to be large in order to ensure the slope of the drooping characteristic of f-P control. Accordingly, control stability may be reduced in the vicinity of response frequency fc. Conversely, if control stability is emphasized and proportional gain Kfp is limited, the performance of grid frequency stabilizing control is limited.

Figure 23:
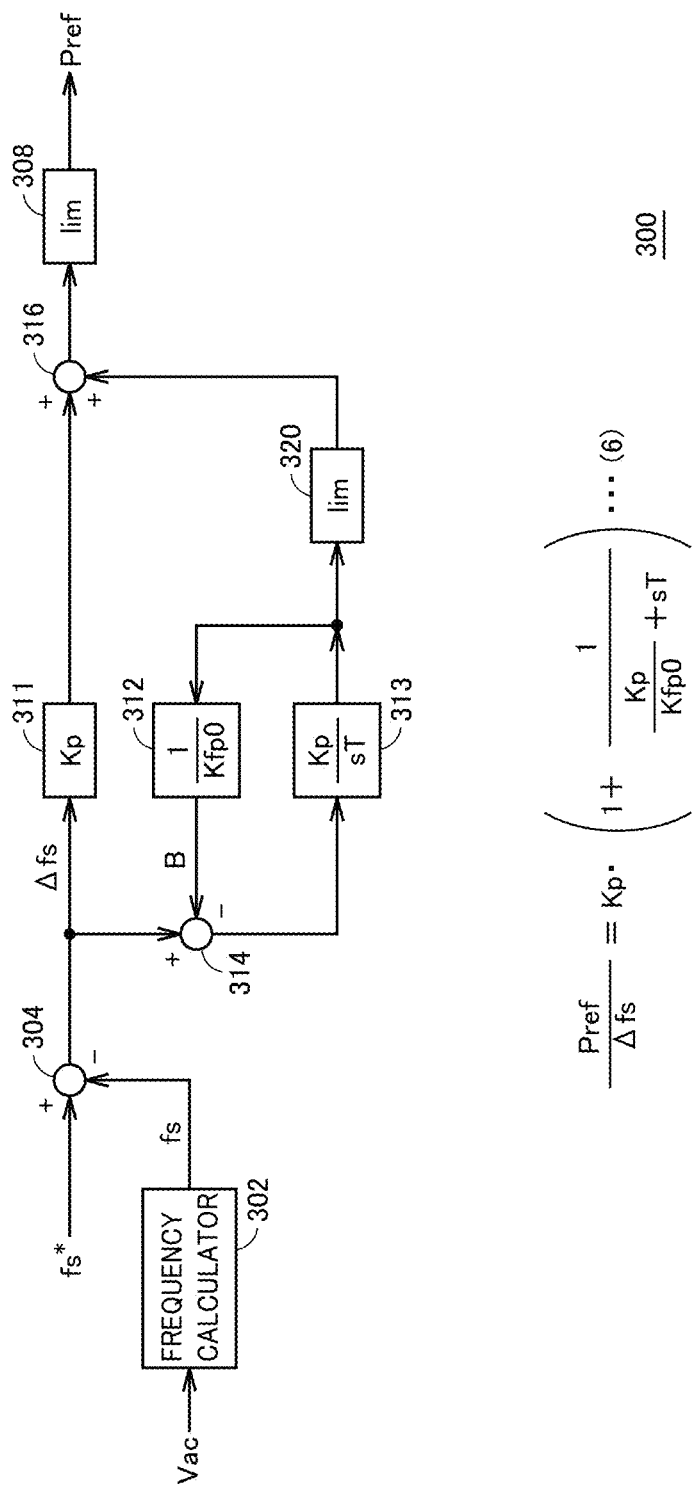
FIG. 23 is a control block diagram of the f-P control unit according to the second embodiment.

In the present second embodiment, therefore, in entire control block 350 shown in FIG. 21, grid control unit 60 is configured such that f-P control unit 200 # according to the comparative example is replaced by f-P control unit 300 shown in FIG. 23.

Entire control block 350 shown in FIG. 21 is also simplified as in FIG. 6 and illustrated only by way of example. That is, it should be noted that the application of the present disclosure is not limited to the configuration using f-P control unit 300 shown in FIG. 23, instead of f-P control unit 300 #, in entire control block 350 shown in FIG. 21.

As shown in FIG. 23, f-P control unit 300 according to the second embodiment includes frequency calculator 302, subtractor 304, and limiter 308 similar to those in FIG. 17, and proportional control elements 311, 312, an integral control element 313, a subtractor 314, an adder 316, and a limiter 320.

Proportional control element 311 outputs a multiplication value of frequency deviation Δfs and proportional gain Kp. Frequency deviation Δfs is input to the (+) side of subtractor 314.

Integral control element 313 integrates the multiplication value of the output of subtractor 314 and the integral gain (Kp/T) (T: integral time). The integral value that is the output of integral control element 313 is multiplied by a gain (1/Kvq0) by proportional control element 312 and set as an input value B to the (−) side of subtractor 314. Limiter 320 has a function similar to that of limiter 308 and is provided for limiting the integral value by integral control element 313 to within the above range of Prefdwn to Prefup. In the second embodiment, the signs of gain Kp and integral time T similar to those in the first embodiment are used for simplification of explanation, but actually, the actual values of gain Kp and integral time T are different between V-Q control and f-P control.

Adder 316 adds the output value of proportional control element 311 (Kp) and the integral value by integral control element 313 (after passing through limiter 320). In f-P control unit 300, the output value of adder 316 passes through limiter 308, whereby power command value Pref is generated. That is, power command value Pref is set so as to be limited within the range of Prefdown≤Pref≤Prefup.

In FIG. 23, when limiters 308, 320 are omitted, the control computation between input Δfs and output Pref can be expressed by the following equation (4) using the input value B to subtractor 314.

$$(\Delta fs - B) \cdot (Kp/sT) + \Delta fs \cdot Kp = Pref \quad (4)$$

For the input value B, the following equation (5) holds.

$$(\Delta fs - B) \cdot (Kp/sT) \cdot (1/Kfp0) = B \quad (5)$$

A system of equations (4) and (5) is solved for (Pref/Δfs) by eliminating the input value A to yield the following equation (6), which is also shown in FIG. 23, for the control computation in f-P control unit 300.

$$\frac{Pref}{\Delta fs} = Kp \cdot \left(1 + \frac{1}{\frac{Kp}{Kfp0} + sT}\right) \quad (6)$$

In equation (6), it is understood that when s→0, that is, the frequency is brought closer to zero, (Pref/Δfs)=Kp+Kfp0. Conversely, it is understood that when s→∞, that is, the frequency is increased, (Pref/Δfs)=Kp. Therefore, with Kp<Kfp0, the gain in the high frequency range can be made lower than the gain in the low frequency range.

Figure 24:
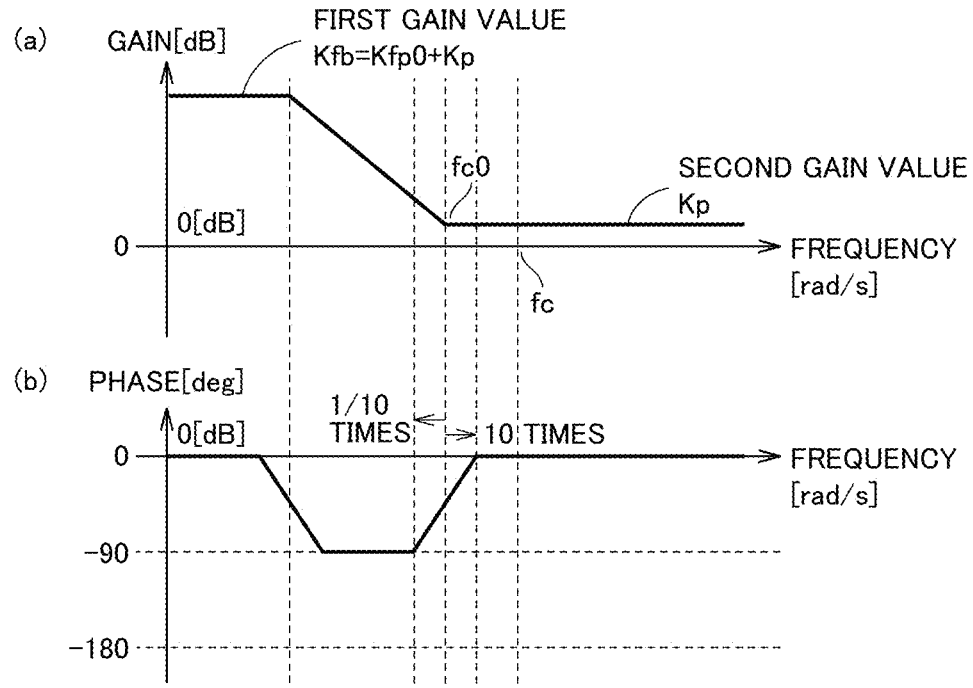
FIG. 24 is a Bode plot showing a frequency characteristic of the f-P control unit according to the second embodiment.

FIG. 24 shows a Bode plot schematically showing the frequency characteristic of input/output response of f-P control unit 300 shown in FIG. 23, that is, the frequency characteristic of f-P control according to the second embodiment. The horizontal axis in FIG. 24(a), (b) shows frequency, the vertical axis in FIG. 24(a) shows control gain, and the vertical axis in FIG. 24(b) shows phase, in the same manner as in FIG. 10 in the first embodiment.

As shown in FIG. 24, even in the f-P control in the second embodiment, the frequency characteristic similar to that in the V-Q control in the first embodiment can be obtained. Specifically, since the proportional control is dominant in the low frequency range (s→0), the control gain is a first gain value indicated by Kfp=Kfp0+Kp and the phase is 0 [deg] (no phase lag). Therefore, in the low frequency range including direct current (0 [Hz]), the control gain can be set to first gain value Kfp. That is, first gain value Kfp corresponds to an example of "first control gain value", and the low frequency range including direct current corresponds to an example of "first frequency range". It is preferable that the above low frequency range in which the control gain is set to first gain value Kfp includes a frequency indicated by a reciprocal of a target value (approximately a few tens of seconds to a few hundreds of seconds) of the settling time of the grid frequency control.

On the other hand, when the frequency increases from the low frequency range, the influence of integral control increases, the control gain decreases from the first gain value, and the phase decreases toward −90 [deg]. When the frequency further increases, the integral control is dominant in the frequency range, and the phase is −90 [deg]. Even in this frequency range, the control gain decreases with increase of frequency.

In the high frequency range (s→∞), the control gain decreases to Kp (second gain value), the proportional control is dominant again, and the phase is 0 [deg]. Broken line frequency fc0 that is the lower limit frequency where control gain=Kp is determined depending on integral time T in integral control element 313.

In order to reduce the control gain at response frequency fc of power conversion device 50 as illustrated in FIG. 20 and FIG. 22, it is also preferable that integral time T is set so that fc0<fc, even in the second embodiment as in the first embodiment. In this case, since the control gain value at response frequency fc is Kp, second gain value Kp corresponds to an example of "second control gain value", and second gain value Kp is set.

Alternatively, even in the second embodiment, if the control gain value in response frequency fc is within a range sufficiently lower than the first gain value (Kfp), fc0>fc can be permitted, and integral time T can be set so that, for example, broken line frequency fc0 is located within the range of fc0<5·fc, as a minimum requirement. In this case, the control gain at response frequency fc that is larger than gain Kp and smaller than gain Kfp corresponds to an example of "second gain value". In either case, it is understood that "second frequency range" in which the control gain value is set to "second gain value" includes response frequency fc.

Gain Kfp (first gain value) in the low frequency range corresponds to the slope of the drooping characteristic similar to that in FIG. 3. Therefore, gains Kp and Kfp0 in FIG. 23 are defined as a value in grid control unit 60 in association with the slope of the obtained drooping characteristic. On the other hand, second gain value Kp can be preset in grid control unit 60, based on the characteristic of power conversion device 50 and the grid frequency-active power characteristic K (FIG. 21) in distribution grid 40.

In grid control unit 60, the gain (1/Kfp0) of proportional control element 312 can be defined by setting Kfp0=Kfp−Kp using the preset gain Kp and the slope Kfp of the drooping characteristic specified by the higher level. When Kfp>>Kp, Kfp≈(Kfp0+Kp), and then in grid control unit 60, Kfp0=Kfq can be readily set using the slope Kfp of the drooping characteristic specified by the higher level as it is.

Figure 25:
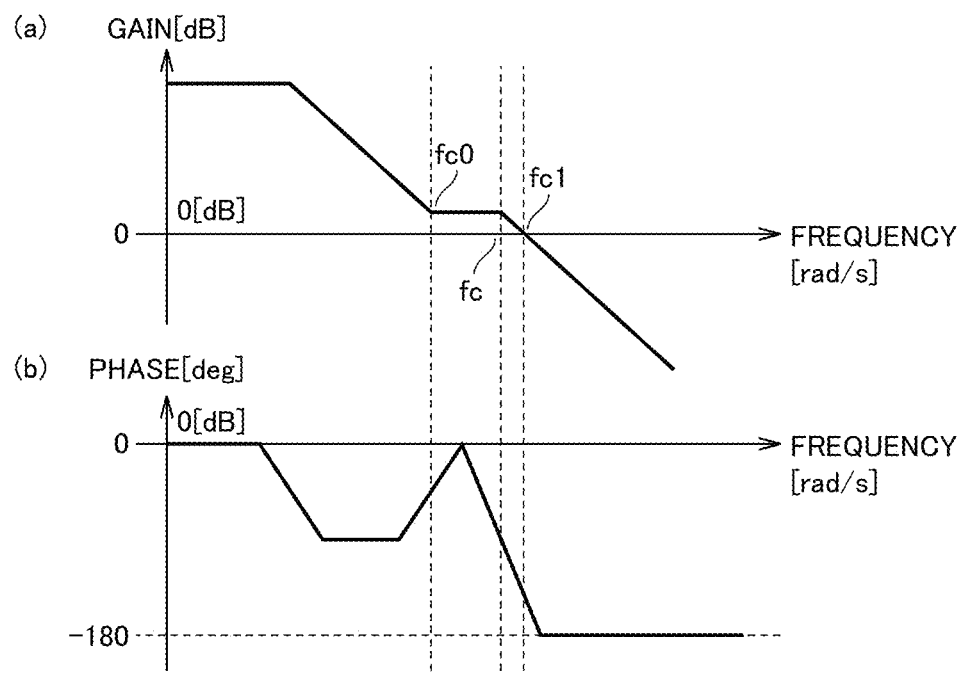
FIG. 25 is a Bode plot showing a frequency characteristic in control of the power converter using the f-P control unit according to the second embodiment.

FIG. 25 shows the frequency characteristic of the entire control block including f-P control unit 300 shown in FIG. 23 and power conversion device 50. Specifically, a Bode plot is shown to schematically illustrate the frequency characteristic when f-P control unit 300 according to the second embodiment is applied instead of f-P control unit 200 # of the comparative example in entire control block 350 in FIG. 21. The horizontal axis in FIG. 25(a), (b) shows frequency, the vertical axis in FIG. 25(a) shows control gain, and the vertical axis in FIG. 25(b) shows phase, in the same manner as in FIG. 22.

As shown in FIG. 25(a), in the low frequency range including direct current (0 [Hz]), the control gain is a value dependent on first gain value Kfp. Thus, a control gain equivalent to that in FIG. 22 for ensuring the slope (Kfp) of the drooping characteristic can be ensured. As a result, the drooping characteristic shown in FIG. 18 can be implemented similarly.

On the other hand, the control gain in the high frequency range including response frequency fc decreases to a value dependent on second gain value Kp. As a result, in the frequency range in the vicinity of response frequency fc of power conversion device 50 that is higher than broken line frequency fc0 shown in FIG. 24, the control gain is a value dependent on second gain value Kp and can be kept lower than a value dependent on first gain value Kvq in the low frequency range.

In the frequency range higher than response frequency fc, the control gain decreases as the frequency increases. In particular, the control gain is 0 [dB] at gain crossover frequency fc1 determined in connection with the frequency characteristic of power conversion device 50 (FIG. 20), the characteristic of f-P control unit 300, and the grid frequency-active power characteristic (K) of distribution grid 40.

In this way, in the grid system to which the f-P control according to the second embodiment is applied, a grid desired drooping characteristic can be imparted without impairing the control stability in the vicinity of response frequency fc. That is, it is understood that the set drooping characteristic can be imparted without impairing the control stability.

In the second embodiment, voltage measuring units 52a, 52b and current measuring units 54a, 54b shown in FIG. 16 correspond to an example of "detector" for detecting a state quantity of distribution grid 40, and grid control units 60a, 60b correspond to an example of "control device" of the grid system. In the second embodiment, grid frequency fs corresponds to "state quantity" of distribution grid 40. Further, in the control block diagram shown in FIG. 23, frequency calculator 302 and subtractor 304 of f-P control unit 300 corresponds to an example of "deviation computation unit", and the elements downstream of subtractor 304 of f-P control unit 300 constitute an example of "control computation unit".

The configuration of f-P control unit 300 shown in FIG. 23 is illustrated only by way of example, and the control computation by f-P control unit 300 can be set as desired as long as the frequency characteristics in the low frequency range including a target value of the grid frequency and the high frequency range including response frequency fc described with reference to FIG. 9 are implemented.

Modifications of Second Embodiment

In a modification of the second embodiment, f-P control in which a dead band is provided for a small change of grid frequency as in the modification of the first embodiment will be described.

Figure 26:
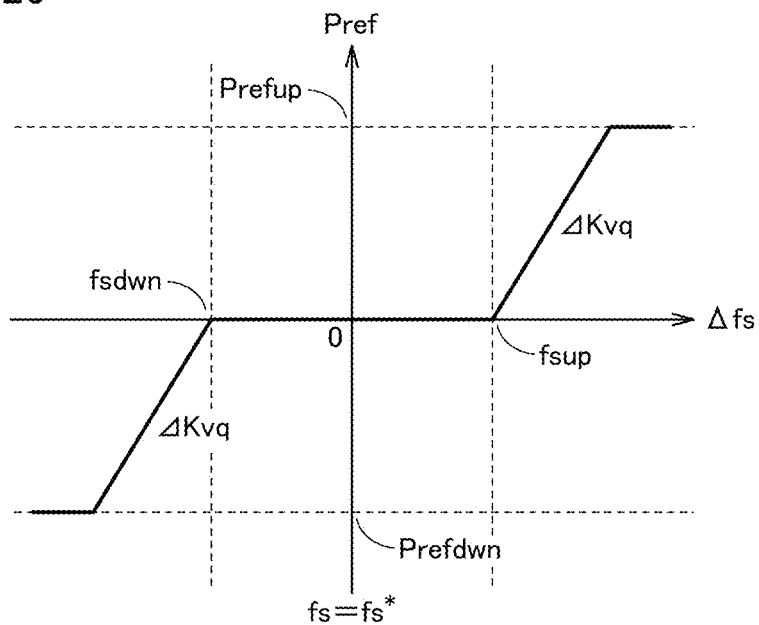
FIG. 26 is a graph showing a drooping characteristic by f-P control according to a modification of the second embodiment.

FIG. 26 shows a drooping characteristic by f-P control according to a modification of the second embodiment.

In FIG. 26 compared with FIG. 18, in a modification of the second embodiment, when a change from grid frequency command value fs* that is a target value of the grid frequency is small, for example, in the range of fsdwn≤Δfs≤fssup (fsdwn<0, fsup>0), Pref=0 is set and f-P control is performed so that an active power is not input/output to/from power conversion device 50 to distribution grid 40.

On the other hand, in the region of Δfs>fsup, power command value Pref is set in accordance with the product of slope Kfp similar to that of FIG. 18 and frequency deviation Δfsup so that an active power of a magnitude proportional to frequency deviation Δfsu (Δfsu=fs*−fs−fsup) is output from power conversion device 50 to distribution grid 40 (Pref=Kfp·Δfsu).

In the region of Δfs<fsdwn, power command value Pref is set in accordance with the product of slope Kfp similar to that of FIG. 18 and frequency deviation Δfsd so that an active power of a magnitude proportional to frequency deviation Δfsd (Δfsd=fs*−fs−fsdwn) is input from distribution grid 40 to power conversion device 50 (Pref=Kfp·Δfsd).

That is, in the region of Δfs>fsup and the region of Δfs<fsdwn, f-P control is performed in accordance with the drooping characteristic having slope Kvq similar to that of FIG. 18.

Figure 27:
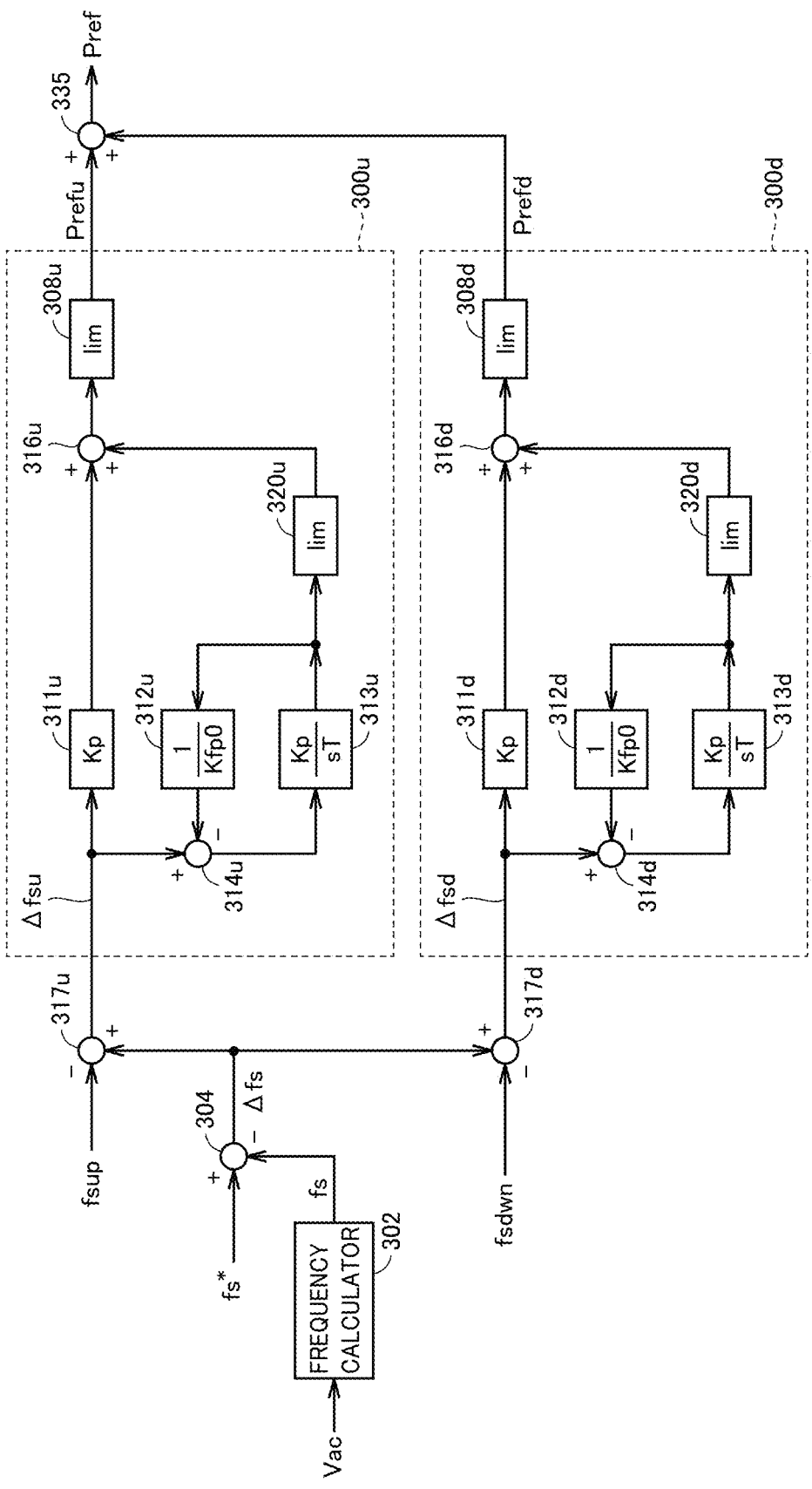
FIG. 27 is a control block diagram of the f-P control unit according to a modification of the second embodiment.

FIG. 27 shows a control block diagram of the f-P control unit according to a modification of the second embodiment.

As shown in FIG. 27, f-P control unit 301 according to a modification of the second embodiment includes frequency calculator 302, subtractor 304, a f-P control unit 300u on the frequency rising side, a f-P control unit 300d on the frequency lowering side, correctors 317u, 317d, and an adder 335.

Corrector 317u calculates a corrected frequency deviation Δfsu by subtracting fsup (>0) in FIG. 26 from frequency deviation Δfs from subtractor 304. As a result, in the region of 0<ΔVrms<fsup, frequency deviation Δfs is a positive value, whereas frequency deviation Δfsu is corrected to a negative value.

Similarly, corrector 317d calculates a corrected frequency deviation Δfsd by subtracting fsdwn (<0) in FIG. 26 from frequency deviation Δfs from subtractor 304. As a result, in the region of fsdwn<Δfs<0, frequency deviation Δfs is a negative value, whereas frequency deviation Δfsd is corrected to a positive value.

f-P control unit 300u includes limiters 308u, 320u, proportional control elements 311u, 312u, an integral control element 313u, a subtractor 314u, and an adder 316u, which are connected in the same manner as limiters 308, 320, proportional control elements 311, 312, integral control element 313, subtractor 314, and adder 316 of V-Q control unit 300 in FIG. 23.

However, limiters 308u, 320u are configured to limit an output value to within the range of 0 to Prefup (Prefup>0). That is, when a negative value is input to limiters 308u, 320u, an output value of limiters 308u, 320u is zero.

f-P control unit 300u receives the corrected frequency deviation Δfsu and outputs Prefu. Through the operation of limiters 308u, 320u described above, when frequency deviation Δfsu<0, that is, Δfs<fsup, output value Prefu of f-P control unit 200u is 0.

On the other hand, when voltage deviation Δfsu≥0, the output value Prefu of f-P control unit 200u is >0 in accordance with frequency deviation Δfsu. The relation between frequency deviation Δfsu and output value Prefu in this case is similar to the relation between frequency deviation Δfs and power command value Pref in f-P control unit 300 (FIG. 23).

Similarly, f-P control unit 300d includes limiters 308d, 320d, proportional control elements 311d, 312d, an integral control element 313d, a subtractor 314d, and an adder 316d, which are connected in the same manner as limiter 308, 320, proportional control elements 311, 312, integral control element 313, subtractor 314, and adder 316 of f-P control unit 300 in FIG. 13.

However, limiters 308d, 320d are configured to limit the output value to within the range of Prefdwn to 0 (Prefdwn<0). That is, when a positive value is input to limiters 308u, 320u, an output value of limiters 308d, 320d is zero.

f-P control unit 300d receives the corrected frequency deviation Δfsd and outputs Prefd. Through the operation of limiters 308d, 320d described above, when frequency deviation Δfsd>0, that is, Δfs>fsdwn, output value Prefd of f-P control unit 300d is 0.

On the other hand, when frequency Δfsd≤0, output value Prefd of f-P control unit 300d is <0 in accordance with frequency deviation Δfsd. The relation between frequency deviation Δfsd and output value Prefd in this case is similar to the relation between frequency deviation Δfs and power command value Pref in f-P control unit 300 (FIG. 23).

Adder 335 adds output value Prefu of f-P control unit 300u and output value Prefd of f-P control unit 300d to generate power command value Pref. As described above, in the range of fsdwn≤Δfs≤fsup shown in FIG. 26, Prefu=Prefd=0 and therefore power command value Pref=0 is set. As a result, the region in which a change of grid frequency is small, where fsdwn≤Δfs≤fsup, can be set as a dead band in which an active power is not input/output to/from distribution grid 40.

On the other hand, in the outside of the dead band, in f-P control unit 300 in FIG. 23, power command value Pref can be set in such a manner that frequency deviation Δfs is replaced by the corrected frequency deviation Δfsu or Δfsd.

In this way, in the system in which the f-P control according to the modification of the second embodiment is applied, a dead band is provided in a region in which a change of grid frequency is small, and in the outside of the dead band, f-P control can be performed in the same manner as in the second embodiment. Therefore, in addition to the effect by the f-P control according to the second embodiment, control stability can be further improved in a region in which a change of grid frequency is small.

In the second embodiment and the modification thereof, the configuration of the grid system can also be changed as appropriate in the same manner as described in the first embodiment with reference to FIG. 13 to FIG. 15.

Power conversion devices 50a, 50b shown in FIG. 1, FIG. 16 and the like can be operated so that both of active power and reactive power are output, for example using a self-commutated inverter connected to demand and supply adjusting means such as a power storage device. In this case, power conversion device 50 (50a, 50b) may perform grid stabilizing control according to the present embodiment so that an AC power in which a reactive power in accordance with power command value Qref for V-Q control according to the first embodiment and an active power in accordance with power command value Pref for f-P control according to the second embodiment are combined is output to distribution grid 40. In this case, in each of power conversion devices 50a, 50b, V-Q control and f-P control can be performed simultaneously in parallel.

Embodiments disclosed here should be understood as being illustrative rather than being limitative in all respects. The technical scope of the present disclosure is shown not in the foregoing description but in the claims, and it is intended that all modifications that come within the meaning and range of equivalence to the claims are embraced here.

REFERENCE SIGNS LIST 10 voltage source device, 20 consumer group, 40, 40a, 40b distribution grid, 40xa, 40xb distribution impedance, 50a, 50b power conversion device, 52a, 52b voltage measuring unit, 54a, 54b current measuring unit, 60, 60a, 60b grid control unit, 100a to 100e grid system, 200, 200d, 200u, 201 V-Q control unit, 300, 300d, 300u, 301 f-P control unit, 202 effective value calculator, 206, 211, 211d, 211u, 212, 212d, 212u, 306, 311, 311d, 311u, 312, 312d, 312u proportional control element, 208, 208d, 208u, 213u, 220, 220d, 220u, 308, 308d, 308u, 320, 320d, 320u limiter, 213, 213d, 213u, 313, 313d, 313u integral control element, 216, 216d, 216u, 235, 316, 316d, 316u, 335 adder, 217d, 217u, 317d, 317u corrector, 250, 350 entire control block, 302 frequency calculator, Pref, Qref power command value, Pxa, Pxb active power, Qxa, Qxb reactive power, T integral time, Vrms grid voltage command value, Vrms* grid voltage effective value, f comparative example, fc response frequency (power conversion device), fc0 broken line frequency, fc1 gain crossover frequency, fs grid frequency, fs* grid frequency command value.

The invention claimed is:

1. A grid system comprising:
   a distribution grid to which a voltage source device is connected;
   a detector to detect a state quantity of the distribution grid;
   a power conversion device to input or output a power for changing the state quantity to or from the distribution grid; and
   a grid control circuit to calculate a power command value for the power conversion device from a deviation between the state quantity obtained from an output of the detector and a control target of the state quantity such that a drooping characteristic for compensating for the deviation is provided, wherein
   the grid control circuit performs control computation having a predetermined frequency characteristic, with the deviation as an input and the power command value as an output, and
   the frequency characteristic is defined such that a first control gain value in a first frequency range including direct current is set corresponding to a slope of the drooping characteristic and a second control gain value in a second frequency range including higher frequencies than the first frequency range is set to be lower than the first control gain value.

2. The grid system according to claim 1, wherein
   the state quantity is a grid voltage effective value of the distribution grid, and
   the grid control circuit calculates the power command value such that the power conversion device outputs, to the distribution grid, a reactive power in a current phase advance direction or a current phase delay direction in accordance with the deviation of the grid voltage effective value and the control target value.

3. The grid system according to claim 2, wherein when an absolute value of the deviation is smaller than a reference value, the grid control circuit calculates the power command value such that the reactive power output from the power conversion device to the distribution grid becomes zero.

4. The grid system according to claim 2, wherein
   the power conversion device is connected to a power storage element and capable of inputting/outputting an active power and the reactive power to/from the distribution grid, and
   the grid control circuit generates the power command value to limit an output amount of the reactive power in accordance with an input/output amount of the active power by charging/discharging of the power storage element, such that an apparent power input/output to/from the power conversion device is equal to or lower than a limit value.

5. The grid system according to claim 1, wherein
   the state quantity is a grid frequency of the distribution grid, and
   the grid control circuit calculates the power command value such that the power conversion device inputs/outputs an active power to/from the distribution grid in accordance with the deviation of the grid frequency and the control target.

6. The grid system according to claim 5, wherein when an absolute value of the deviation is smaller than a reference value, the grid control circuit calculates the power command value such that the active power input/output between the power conversion device and the distribution grid becomes zero.

7. The grid system according to claim 1, wherein the second frequency range includes a response frequency of the power conversion device.

8. The grid system according to claim 1, wherein
   the frequency characteristic is defined such that (i) a third frequency range in which a phase lag is 90 degrees is provided between the first frequency range and the second frequency range, and (ii) the phase lag approaches 0 degrees with increase of a frequency in a frequency range including higher frequencies than the third frequency range.

9. The grid system according to claim 1, wherein
   the frequency characteristic is defined such that (i) a third frequency range in which a control gain decreases with increase of a frequency is provided between the first frequency range and the second frequency range, and (ii) the second frequency range includes a frequency range in which the control gain is constantly maintained with increase of the frequency.

10. A control device of a grid system including a distribution grid to which a voltage source device is connected, the control device comprising:
    a deviation computation unit to calculate a deviation between a state quantity of the distribution grid and a control target of the state quantity, based on an output of a detector provided in the distribution grid; and
    a control computation unit to generate a power command value for a power conversion device for inputting or outputting a power for changing the state quantity to or from the distribution grid, wherein
    the control computation unit performs control computation having a predetermined frequency characteristic, with the deviation as an input and the power command value as an output, such that a drooping characteristic for compensating for the deviation calculated by the deviation computation unit is provided, and
    the frequency characteristic is defined such that a first control gain value in a first frequency range including direct current is set corresponding to a slope of the drooping characteristic and a second control gain value in a second frequency range including higher frequencies than the first frequency range is set to be lower than the first control gain value.

11. The control device according to claim 10, wherein
    the state quantity is a grid voltage effective value of the distribution grid, and
    the control computation unit calculates the power command value such that the power conversion device outputs, to the distribution grid, a reactive power in a current phase advance direction or a current phase delay direction in accordance with the deviation of the grid voltage effective value and the control target value.

12. The control device according to claim 11, wherein when an absolute value of the deviation is smaller than a reference value, the control computation unit calculates the power command value such that the reactive power output from the power conversion device to the distribution grid becomes zero.

13. The control device according to claim 10, wherein
    the state quantity is a grid frequency of the distribution grid, and
    the control computation unit calculates the power command value such that the power conversion device inputs/outputs an active power to/from the distribution grid in accordance with the deviation of the grid frequency and the control target.

14. The control device according to claim 13, wherein when an absolute value of the deviation is smaller than a reference value, the control computation unit calculates the power command value such that the active power input/output between the power conversion device and the distribution grid becomes zero.

15. The control device according to claim 10, wherein the second frequency range includes a response frequency of the power conversion device.

16. The control device according to claim 10, wherein
    the frequency characteristic is defined such that (i) a third frequency range in which a phase lag is 90 degrees is provided between the first frequency range and the second frequency range, and (ii) the phase lag approaches 0 degrees with increase of a frequency in a frequency range including higher frequencies than the third frequency range.

17. The control device according to claim 10, wherein
    the frequency characteristic is defined such that (i) a third frequency range in which a control gain decreases with increase of a frequency is provided between the first frequency range and the second frequency range, and (ii) the second frequency range includes a frequency range in which the control gain is constantly maintained with increase of the frequency.

* * * * *